United States Patent
Kishigami et al.

(10) Patent No.: US 10,976,545 B2
(45) Date of Patent: Apr. 13, 2021

(54) DISPLAY DEVICE AND ADJUSTMENT METHOD

(71) Applicant: Mitsubishi Electric Corporation, Tokyo (JP)

(72) Inventors: Tomo Kishigami, Tokyo (JP); Nobuo Takeshita, Tokyo (JP); Atsushi Michimori, Tokyo (JP); Shota Nakahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 25 days.

(21) Appl. No.: 16/320,059

(22) PCT Filed: Aug. 30, 2017

(86) PCT No.: PCT/JP2017/031146
§ 371 (c)(1),
(2) Date: Jan. 23, 2019

(87) PCT Pub. No.: WO2018/043558
PCT Pub. Date: Mar. 8, 2018

(65) Prior Publication Data
US 2019/0271840 A1    Sep. 5, 2019

(30) Foreign Application Priority Data
Sep. 1, 2016  (JP) ............... JP2016-171003

(51) Int. Cl.
*G02B 27/01*  (2006.01)
*B60K 35/00*  (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC ................ G02B 27/0101; G02B 27/01; G02B 2027/014; G02B 2027/0154;
(Continued)

(56) References Cited

U.S. PATENT DOCUMENTS

| 2012/0256812 | A1* | 10/2012 | Aoki ...................... B60K 35/00 345/7 |
| 2016/0070102 | A1* | 3/2016 | Takamatsu ......... G02B 27/0149 359/631 |

(Continued)

FOREIGN PATENT DOCUMENTS

| CN | 102713724 B | 7/2014 |
| DE | 10 2011 075 702 A1 | 11/2012 |

(Continued)

OTHER PUBLICATIONS

Extended European Search Report dated Jul. 24, 2019 in counterpart European Patent Application No. 17846562.1.
(Continued)

*Primary Examiner* — Amare Mengistu
*Assistant Examiner* — Gloryvid Figueroa-Gibson
(74) *Attorney, Agent, or Firm* — Birch, Stewart, Kolasch & Birch, LLP

(57) ABSTRACT

A display device used in a vehicle for displaying virtual images includes: a display including a light source to emit image light and a screen on which the image light is projected; and a controller to adjust positions at which the virtual images are displayed. Images displayed on the screen are projected as the virtual images. The virtual images include first and second virtual images displayed at different positions. The display displays, on the screen, a first adjustment image that is projected to a display area of the first virtual image and a second adjustment image that is projected to a display area of the second virtual image. The
(Continued)

controller adjusts a position of the display area of the first virtual image and a position of the display area of the second virtual image on a basis of the first adjustment image and the second adjustment image.

12 Claims, 9 Drawing Sheets

(52) U.S. Cl.
CPC ............... *B60K 2370/1529* (2019.05); *B60K 2370/177* (2019.05); *B60K 2370/334* (2019.05); *B60K 2370/785* (2019.05); *B60K 2370/92* (2019.05); *G02B 2027/014* (2013.01); *G02B 2027/0154* (2013.01); *G02B 2027/0185* (2013.01); *G02B 2027/0187* (2013.01)

(58) Field of Classification Search
CPC .... G02B 2027/0185; G02B 2027/0187; B60K 35/00; B60K 2370/1529; B60K 2370/177; B60K 2370/92; B60K 2370/334; B60K 2370/785

USPC .......................................................... 345/7
See application file for complete search history.

(56) References Cited

U.S. PATENT DOCUMENTS

| 2016/0178902 | A1 | 6/2016 | Ando et al. |
| 2017/0184843 | A1* | 6/2017 | Kuzuhara .......... G02B 17/0848 |

FOREIGN PATENT DOCUMENTS

| EP | 2 515 156 A1 | 10/2012 |
| JP | 6-115381 A | 4/1994 |
| JP | 2009-184406 A | 8/2009 |
| JP | 2011-64760 A | 3/2011 |
| JP | 2015-34919 A | 2/2015 |
| JP | 2015-34945 A | 2/2015 |

OTHER PUBLICATIONS

Office Action dated Aug. 28, 2020 in corresponding Chinese Application No. 201780051122.5.

* cited by examiner

DISPLAY DEVICE AND ADJUSTMENT METHOD

TECHNICAL FIELD

The present invention relates to a display device, such as a head up display, used in a vehicle, such as an automobile or a train, for displaying a virtual image.

BACKGROUND ART

A head up display (referred to below as a HUD) for a vehicle displays drive support information as a virtual image in front of a windshield as viewed from the driver. The drive support information is, for example, speed indication, navigation information, or the like. The driver can see a forward scene of the vehicle and the drive support information. The forward scene of the vehicle and the drive support information are superimposed. This allows the driver to reduce the time required to move the line of sight or adjust the focus during driving. This can reduce the driver's fatigue or improve safety. "Forward scene" refers to a scene seen ahead.

The driver drives while viewing the environment. Thus, the viewing point of the driver is not fixed and moves to various positions. Also, the distance from the eye position of the driver to the viewing point varies from near distance to far distance. At this time, when the position of the viewing point in the forward scene of the vehicle and the display position of the virtual image are at different distances from the driver's eyes, the driver cannot simultaneously see the forward scene and virtual image while focusing on them. Thus, there is proposed a method of adjusting the distance from the driver to the virtual image to the distance to the forward scene of the vehicle (for example, Patent Literature 1).

Patent Literature 1 discloses a method that changes the display distance of the virtual image by using a concave mirror as a turning mirror and moving a display as an object point. Specifically, a virtual image control method of Patent Literature 1 controls the display distance of the virtual image in a depth direction without changing the display position of the virtual image as viewed from the driver.

CITATION LIST

Patent Literature

Patent Literature 1: Japanese Patent Application Publication No. H6-115381 (page 2, line 40 to page 3, line 19 and FIG. 2)

SUMMARY OF INVENTION

Technical Problem

However, when viewed from the driver, the depression angle of a near forward scene is larger than the depression angle of a far forward scene. Thus, there is a problem of adjusting the display position of the virtual image so that the depression angle matches the display distance. "Depression angle" refers to an angle formed by the direction of a line of sight looking down an object and a horizontal plane at the eye height. The depression angle is also referred to as a "looking down angle."

The present invention has been made to solve the problem as described above, and is intended to allow display positions of virtual images to be adjusted depending on display distances of the virtual images in a depth direction.

Solution to Problem

A display device according to the present invention is a display device used in a vehicle for displaying virtual images, and includes: an image display unit including a light source unit to emit image light and a screen on which the image light is projected; and a controller to adjust positions at which the virtual images are displayed, wherein images displayed on the screen are projected as the virtual images, the virtual images include a first virtual image and a second virtual image displayed at a position different from that of the first virtual image, the image display unit displays, on the screen, a first adjustment image that is projected to a display area of the first virtual image and a second adjustment image that is projected to a display area of the second virtual image, and the controller adjusts a position of the display area of the first virtual image and a position of the display area of the second virtual image on a basis of the first adjustment image and the second adjustment image.

Advantageous Effects of Invention

The present invention can adjust display positions of virtual images depending on display distances of the virtual images.

DESCRIPTION OF EMBODIMENTS

First Embodiment

<Configuration of Virtual Image Display Device 100>

Figure 1:
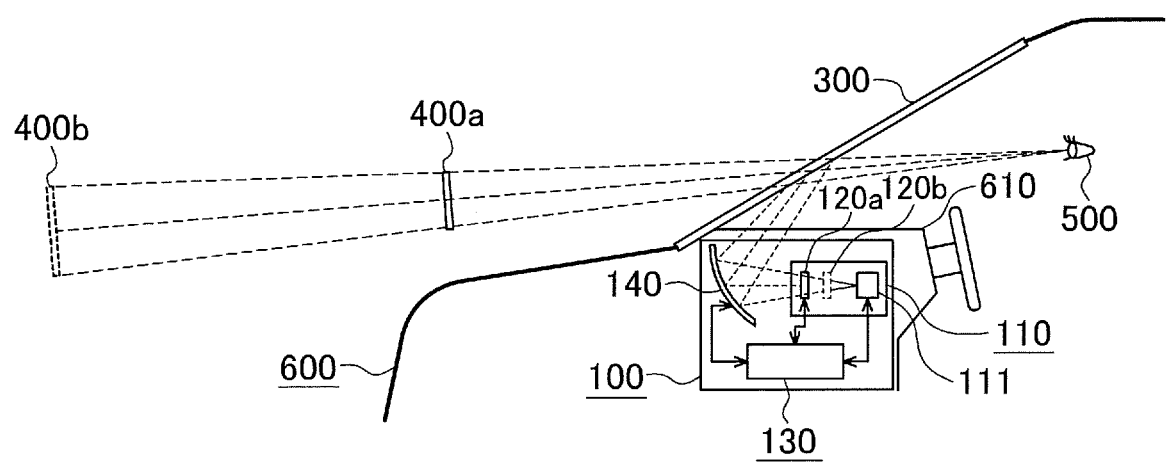
FIG. 1 is a configuration diagram in which a display device according to a first embodiment of the present invention is installed in a vehicle.

FIG. 1 is a schematic diagram illustrating an example of a configuration of a virtual image display device 100 according to a first embodiment. The virtual image display device 100 is, for example, a head up display for a vehicle. The virtual image display device 100 is installed, for example, in a dashboard 610 of a vehicle 600. However, the virtual image display device 100 is not limited to a head up display, and its installation location is not limited to a dashboard.

The virtual image display device 100 includes an image display unit (or image display) 110 and a controller 130. The virtual image display device 100 may include a magnifying mirror 140. The image display unit 110 includes a light source unit (or light source) 111 and a screen 120.

The light source unit 111 emits image light like a projector, for example. "Image light" refers to light having image information. The image light emitted by the light source unit 111 has information of an image that is displayed as a virtual image. The image light may include information of a still image, for example.

The image light emitted from the light source unit 111 is projected onto the screen 120. Thus, an image is imaged on the screen 120. The image light incident on the screen 120 from the light source unit 111 side passes through the screen 120.

The image light is projected on the screen 120. The screen 120 is a transmissive screen. "Project" refers to emitting image light or displaying an image with image light. Here, the image includes a virtual image. Thus, "project" is used with respect to emitted image light or images (including a virtual image) displayed by image light.

The screen 120 has two screens 120a and 120b, depending on its installation position, for example. The screen 120 has the screen 120a for a near virtual image and the screen 120b for a far virtual image.

The screen 120 may be, for example, a single movable screen. Specifically, the single screen 120 moves between the position of the screen 120a and the position of the screen 120b. For example, a driver 500 can select one of the screen 120a for the near virtual image and the screen 120b for the far virtual image, depending on the time.

The screen 120 may also be, for example, two screens divided in a left-right direction. For example, the left screen may be the screen 120a for the near virtual image, and the right screen may be the screen 120b for the far virtual image. In this case, the light source unit 111 can simultaneously project image light onto the screen 120a for the near virtual image and the screen 120b for the far virtual image.

The magnifying mirror 140 includes a reflecting surface (concave surface) having negative power. The magnifying mirror 140 projects images imaged on the screen 120. The magnifying mirror 140 magnifies and projects images imaged on the screen 120, for example.

The magnifying mirror 140 has a function of a projection optical system. The projection optical system projects images imaged on the screen 120. The projection optical system includes, as its component, the magnifying mirror 140. The projection optical system may include, as its component, a windshield 300 or a combiner.

The magnifying mirror 140 projects image light passing through the screen 120 toward the windshield 300, for example. The windshield 300 is, for example, a front window of the vehicle. The windshield 300 reflects the image light from the magnifying mirror 140 to direct it to the driver 500.

Here, a front window head up display is described as an example. However, the virtual image display device 100 is applicable to a combiner head up display. The front window (windshield 300) and combiner have the function of reflecting image light projected from the virtual image display device 100 toward the driver or the like.

Images imaged on the screen 120 are displayed as virtual images in a virtual image area 400. The virtual image area 400 is in front of the windshield 300 as viewed by the driver 500. The virtual image area 400 is a display area of virtual images displayed through the screen 120. The virtual image area 400 moves depending on the position of the screen 120 or other factors.

An image on the near virtual image screen 120a is displayed as a virtual image in a near virtual image area 400a. An image on the far virtual image screen 120b is displayed as a virtual image in a far virtual image area 400b. The driver 500 can see an image projected by the magnifying mirror 140 and a scene in front of the windshield 300 in a superimposed manner.

The reflecting surface of the magnifying mirror 140 may be formed by a free-form surface. Thereby, the magnifying mirror 140 can compensate image distortion due to the curvature of the windshield 300.

The controller 130 can control the image display unit 110, magnifying mirror 140, or screen 120. A configuration of the controller 130 will be described later.

The controller 130 adjusts the positions at which virtual images are displayed. Specifically, the adjustment of the positions at which virtual images are displayed includes adjustment of the distances from the vehicle to the virtual images, adjustment of the positions of the virtual images in a height direction, and adjustment of the inclinations of the virtual images.

The configuration of the device before image light emitted from the light source unit 111 reaches the driver 500 is not limited to the configuration illustrated in FIG. 1. For example, it may be configured so that the image light is reflected by a reflecting surface other than the magnifying mirror 140 or windshield 300. The screen 120 is not limited to a transmissive one, and may be a reflective one. The configuration of the device can be changed in view of available space in the dashboard 610 and the sizes of the optical components.

<Configuration of Controller 130>

Figure 2:
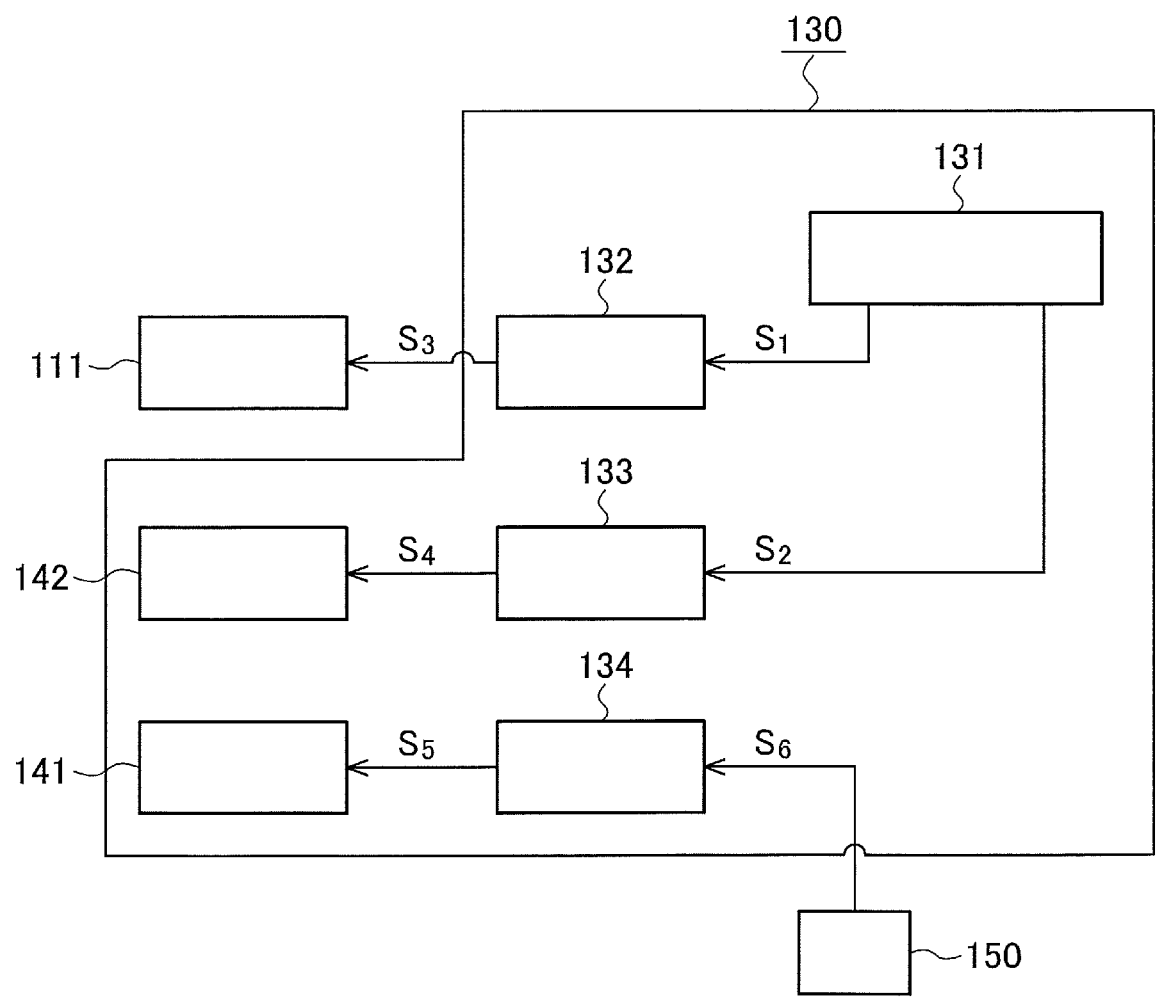
FIG. 2 is a configuration diagram of a controller of the display device according to the first embodiment of the present invention.

FIG. 2 is a configuration diagram of the controller 130 of the virtual image display device 100. The controller 130 includes an image data converter 131, a light source controller 132, a virtual image controller 133, and a projection position controller 134.

The controller 130 may include a magnifying mirror drive circuit 141 and a screen drive circuit 142.

The image data converter 131 is a part that converts image signal data on which an image displayed as a virtual image is based, into a form capable of being handled by the light source controller 132 and virtual image controller 133. The image signal data includes, for example, an image for a virtual image, a magnification ratio of an image, a display direction of a virtual image, distance data indicating a display distance of a virtual image in a near-far (or depth) direction, or the like.

The image data converter 131 can receive image signal data generated in the virtual image display device 100. The image data converter 131 can also receive image signal data generated in the controller 130, for example.

The virtual image display device 100 or controller 130 receives information on the traveling speed of the vehicle, information on the outside air temperature, or the like from an external device, for example. The virtual image display device 100 or controller 130 then generates image signal data including an image for a virtual image or the like on the basis of these items of information. The virtual image display device 100 or controller 130 provides the generated image signal data to the image data converter 131.

The image data converter 131 can also receive image signal data generated in a device outside the virtual image display device 100, for example. The device outside the virtual image display device 100 is, for example, a part that controls the vehicle 600, a navigation system, or the like.

The image data converter 131 can also receive image signal data from outside the vehicle 600. The image signal data received from outside the vehicle 600 is, for example, data generated on the basis of Internet information or the like.

The image data converter 131 sends image signal data $S_1$ and $S_2$ to the light source controller 132 and virtual image controller 133.

The light source controller 132 controls emission of image light by the light source unit 111. The light source controller 132 receives the image signal data $S_1$ from the image data converter 131. The light source controller 132 generates, on the basis of the image signal data $S_1$, image data on which image light emitted from the light source unit 111 is based. At this time, the size of the image, the position at which the image is displayed, or the like is determined in view of a direction or a depth of the displayed virtual image. Then, the image data is generated. A method of determining the size (dimensions) of the image, the position at which the image is displayed, or the like will be described later. The light source controller 132 sends the generated image data as a control signal $S_3$ to the light source unit 111.

The light source unit 111 emits image light. The light source unit 111 emits image light on the basis of the control signal $S_3$. The light source unit 111 receives the control signal $S_3$ from the light source controller 132. The control signal $S_3$ is a signal for controlling the light source unit 111 on the basis of the image data.

The virtual image controller 133 generates a signal for controlling the position of the screen 120. The virtual image controller 133 receives the image signal data $S_2$ from the image data converter 131. The virtual image controller 133 sends a control signal $S_4$ to the screen drive circuit 142 on the basis of the image signal data $S_2$. The control signal $S_4$ is a signal for controlling the position or inclination of the screen 120.

For example, in FIG. 1, by moving the screen 120 to the position of the far virtual image screen 120b, a virtual image is displayed at the position of the far virtual image area 400b. Thereby, the driver 500 sees the virtual image displayed far away.

The distance from the driver 500 to the virtual image depends on the optical path length from the screen 120 to the windshield 300, the magnification ratio of the magnifying mirror 140, or the like. The optical path length from the far virtual image screen 120b to the windshield 300 is longer than the optical path length from the near virtual image screen 120a to the windshield 300. Thus, the far virtual image area 400b is farther from the driver 500 than the near virtual image area 400a.

The virtual image controller 133 determines the distance from the driver 500 to the virtual image area 400a, 400b, on the basis of the image signal data $S_2$ from the image data converter 131. Information other than the image signal data $S_2$ may be used to determine the distance from the driver 500 to the virtual image area 400a, 400b. However, this case requires a process of associating information on the distance with the image displayed by the virtual image display device 100.

The screen drive circuit 142 adjusts the position of the screen 120. The screen drive circuit 142 adjusts the position of the screen 120 on the basis of the control signal $S_1$. Thus, the position (virtual image area 400a, 400b) where the virtual image is displayed moves in the near-far direction. The "near-far direction" is a traveling direction of the vehicle 600, in the embodiment. The screen drive circuit 142 receives the control signal $S_4$ from the virtual image controller 133. The control signal $S_4$ is position information of the screen 120.

The projection position controller 134 generates a signal $S_5$ for changing a position or an angle of the magnifying mirror 140. The projection position controller 134 receives a signal $S_6$ for adjusting the magnifying mirror 140, from an external input unit 150.

The input unit 150 is, for example, an input button, a switch, a dial, or the like. The input unit 150 is provided in the vehicle 600 for controlling the projection positions of virtual images. The input unit 150 is operated by the driver 500, for example.

The projection position controller 134 converts the signal $S_6$ into the control signal $S_5$. The control signal $S_5$ is a signal for changing the position or angle of the magnifying mirror 140. The projection position controller 134 then sends the control signal $S_5$ to the magnifying mirror drive circuit 141.

The magnifying mirror drive circuit 141 adjusts the position or angle of the magnifying mirror 140. The magnifying mirror drive circuit 141 adjusts the position or angle of the magnifying mirror 140 on the basis of the control signal $S_5$. Thus, the positions (virtual image areas 400a and 400b) where the virtual images are displayed move. The driver 500 can optimally adjust the projection positions through the input means while observing projected virtual images. The magnifying mirror drive circuit 141 receives the control signal $S_5$ from the projection position controller 134. The control signal $S_5$ is a signal for adjusting the position or angle of the magnifying mirror 140.

<Images for Adjusting Display Positions of Virtual Images>

Figure 3A:
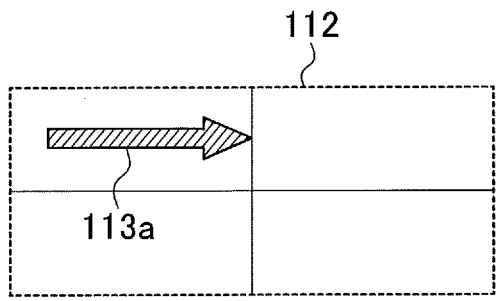
FIGS. 3A to 3D are explanatory diagrams illustrating an example of the display positions of virtual images of the display device according to the first embodiment of the present invention.
Figure 3B:
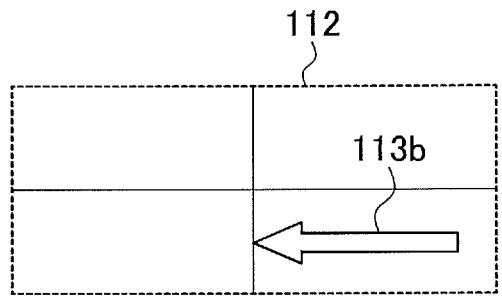

FIGS. 3A to 3D are explanatory diagrams illustrating an example of the adjustment of the display positions of the virtual images in a vertical direction. Hereinafter, display of adjustment images used in adjusting the display positions of the virtual images will be described. FIGS. 3A and 3B illustrate an example of adjustment images that are input to the light source unit 111 when the display positions of the virtual images are adjusted. FIGS. 3A to 3D are views as seen by the driver 500 through the magnifying mirror 140.

FIG. 3A is an image that is input to the light source unit 111 when a virtual image is displayed near the driver 500.

An input image format 112 of the control signal $S_3$ represents the entire area of an image output by the light source unit 111. The control signal $S_3$ is input to the light source unit 111. The input image format 112 is an area within which the light source unit 111 can perform display on the screen 120.

In FIG. 3A, an adjustment image 113a for short distance is set on the upper side of the entire image area of the input image format 112. Also, in FIG. 3A, the adjustment image 113a for short distance is set, for example, on the left side of the entire image area of the input image format 112.

FIG. 3B is an image that is input to the light source unit 111 when a virtual image is displayed far from the driver 500.

In FIG. 3B, an adjustment image 113b for long distance is set on the lower side of the entire image area of the input image format 112. Also, in FIG. 3B, the adjustment image 113b for long distance is set, for example, on the right side of the entire image area of the input image format 112.

The cross lines in FIGS. 3A to 3D are rough indications of vertical and horizontal center positions of the screens, and thus are not displayed as images. Likewise, the cross lines in other drawings are rough indications.

Figure 3C:
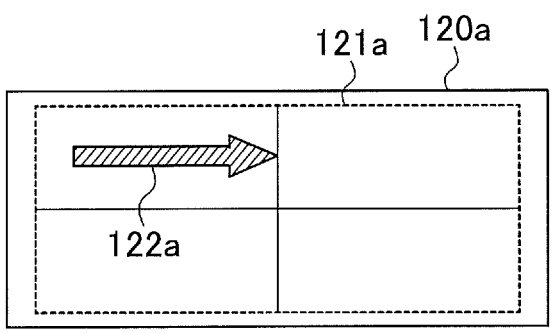

FIG. 3C is an example illustrating an image when the image of FIG. 3A is projected on the near virtual image screen 120a.

The projection area 121a is an area within which an image is projected on the screen 120 during the short distance time. The projection area 121a during the short distance time is an area within which the image of the input image format 112 is projected on the near virtual image screen 120a. The short-distance adjustment image 113a is projected on the near virtual image screen 120a as an adjustment intermediate image 122a for short distance.

Figure 3D:
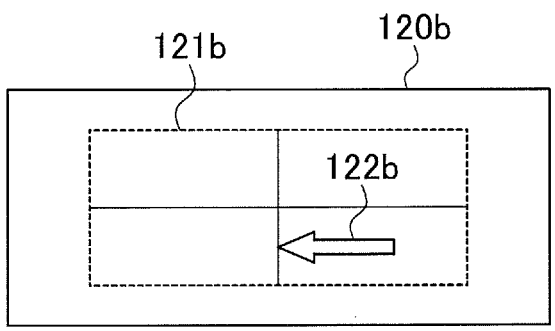

FIG. 3D is an example illustrating an image when the image of FIG. 3B is projected on the far virtual image screen 120b.

The projection area 121b is an area within which an image is projected on the screen 120 during the long distance time. The projection area 121b during the long distance time is an area within which the image of the input image format 112 is projected on the far virtual image screen 120b. The long-distance adjustment image 113b is projected on the far virtual image screen 120b as an adjustment intermediate image 122b for long distance.

Here, the far virtual image screen 120b is nearer to the light source unit 111 than the near virtual image screen 120a. Thus, a projection distance from the light source unit 111 to the screen 120b is shorter than a projection distance from the light source unit 111 to the screen 120a.

Thus, the area of the long-distance projection area 121b is smaller than the area of the short distance-projection area 121a. Likewise, the size of the long-distance adjustment intermediate image 122b is smaller than the size of the short-distance adjustment intermediate image 122a.

<Relationship Between Height of Driver's Eye Position and Virtual Image Display Positions>

Figure 4:
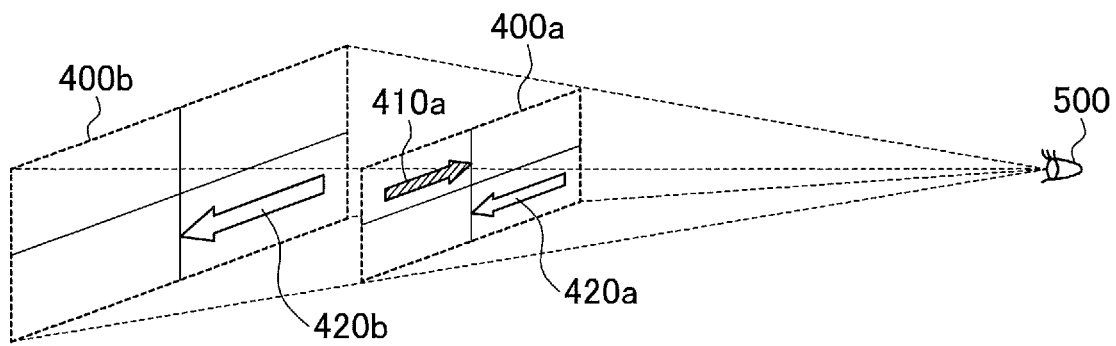
FIG. 4 is a schematic diagram stereoscopically illustrating virtual images of the display device according to the first embodiment of the present invention.

FIG. 4 is a schematic diagram stereoscopically illustrating a state where virtual images are seen from the driver 500.

The driver 500 can see the images projected on the screen 120 as described with FIGS. 3C and 3D as virtual images. FIG. 4 illustrates the driver 500 and the virtual images displayed in the virtual image areas 400a and 400b, and omits the other optical system. For ease of understanding of description, the ratios between the size of the driver 500, the sizes of the virtual images, and their distances are different from the actual ones.

The near virtual image area 400a is an area in which an image projected on the short-distance projection area 121a on the near virtual image screen 120a is displayed as a virtual image. The far virtual image area 400b is an area in which an image projected on the long-distance projection area 121b on the far virtual image screen 120b is displayed as a virtual image.

The adjustment virtual image 410a for short distance is a virtual image of the short-distance adjustment intermediate image 122a. The adjustment virtual image 420b for long distance is a virtual image of the long-distance adjustment intermediate image 122b. The adjustment virtual image 420a for long distance illustrated in the near virtual image area 400a indicates the position of the adjustment virtual image 420b for long distance in the near virtual image area 400a as viewed from the position of the driver 500.

A visual angle of the near virtual image area 400a as viewed from the driver 500 equals a visual angle of the far virtual image area 400b. Here, the visual angle is an angle in the vertical direction formed by two straight lines from the upper end and lower end of the virtual image area 400a to the eyes of the driver 500.

The near virtual image area 400a and far virtual image area 400b are seen from the driver 500 in the same direction.

Here, the direction in which the virtual image area 400 is viewed from the driver 500 is represented by a depression angle. Specifically, the direction of the virtual image area 400 is represented by an angle formed by a horizontal plane and a direction from the eye position of the driver 500 toward a center of the virtual image area 400.

An example in which virtual images are displayed below the eye height of the driver 500 is described. Thus, the depression angle is used. When virtual images are displayed above the eye height of the driver 500, an elevation angle may be used.

In FIG. 4, the driver 500 sees the long-distance adjustment virtual image 420b below the short-distance adjustment virtual image 410a. This is because in the near virtual image area 400a, the position of the long-distance adjustment virtual image 420a is below the position of the short-distance adjustment virtual image 410a.

Hereinafter, such a state will be described by saying that "the position of the long-distance adjustment virtual image 420a is seen below the position of the short-distance adjustment virtual image 410a," or "the long-distance adjustment virtual image 420a is lower than the short-distance adjustment virtual image 410a."

As above, the directions of the adjustment virtual images 410 and 420 as seen from the driver 500 are described by the relative positional relationship, such as "above or below" or "higher or lower in height." Likewise, those of the near virtual image area 400a and far virtual image area 400b are also described by the relative positional relationship.

Here, "height" refers to the height (or level) of the position of the adjustment virtual image 410 or 420 or the virtual image area 400a or 400b in an up-down direction (the vertical direction). It does not refer to the vertical height of the adjustment vertical image 410 or 420 itself. It also does not refer to the vertical height of the virtual image area 400a or 400b itself.

The distance from the far virtual image screen 120b to the light source unit 111 is shorter than the distance from the near virtual image screen 120a to the light source unit 111. Thus, the long-distance projection area 121b is smaller than the short-distance projection area 121a.

On the other hand, with respect to the optical path length in the projection optical system after the screen 120, the optical path length from the near virtual image screen 120a is shorter than the optical path length from the far virtual image screen 120b.

Thus, when virtual images are displayed, an image in the long-distance projection area 121b is magnified more than an image in the short-distance projection area 121a. The near virtual image area 400a and far virtual image area 400b are at different distances from the driver 500. However, the visual angles of the two are equal. Thus, the driver 500 sees that the size of the near virtual image area 400a and the size of the far virtual image area 400b are equal.

Figure 5A:
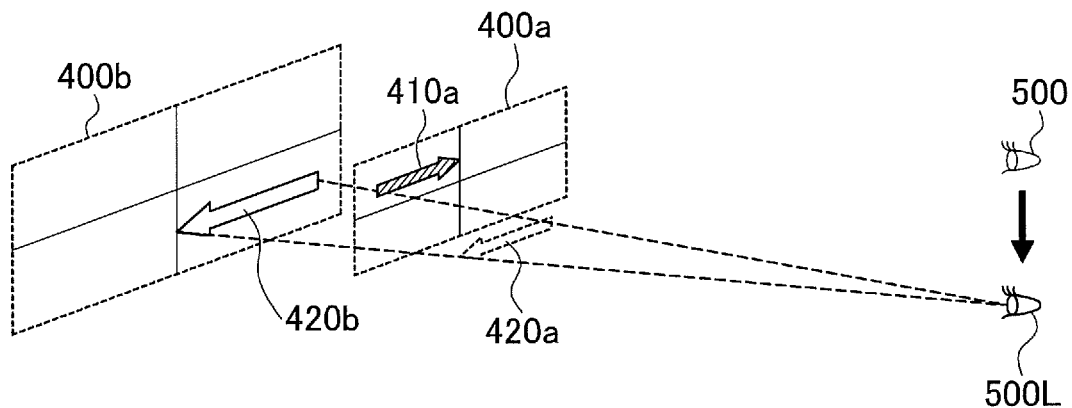
FIGS. 5A to 5c are explanatory diagrams each illustrating an example of display of virtual images by the display device according to the first embodiment of the present invention.
Figure 5B:
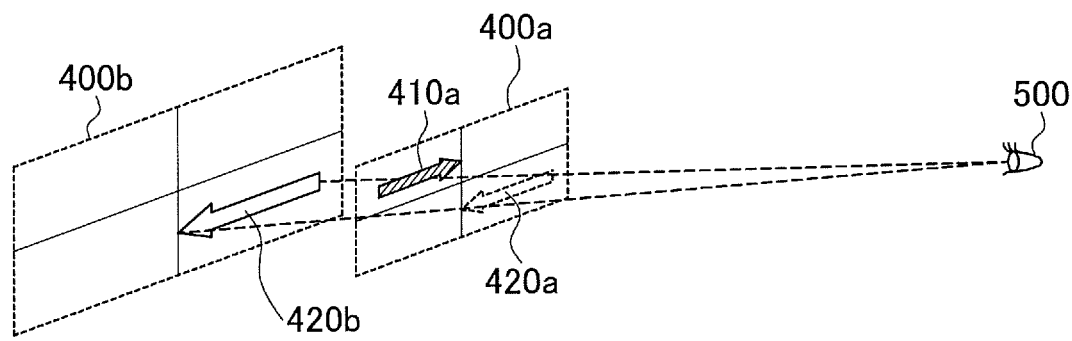
Figure 5C:
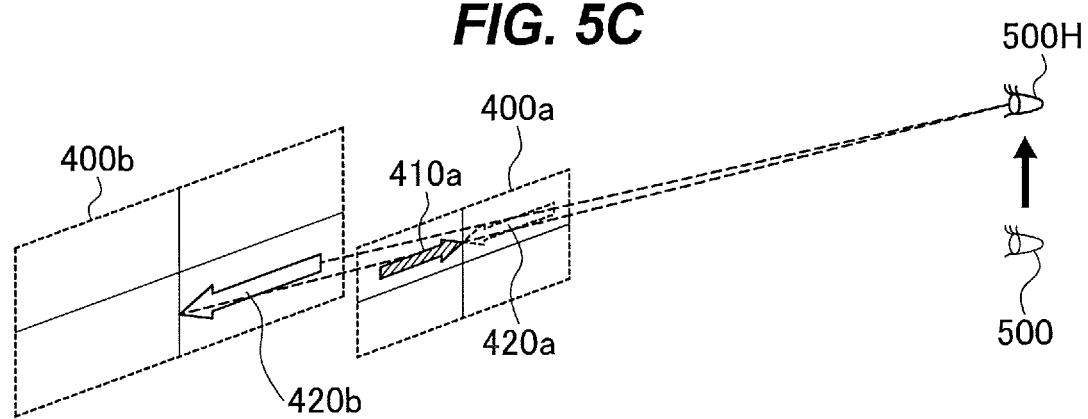

FIGS. 5A to 5C are explanatory diagrams each illustrating an example of the adjustment virtual images 410 and 420 displayed by the virtual image display device 100.

With respect to the appearance of the adjustment virtual images 410 and 420 from the driver 500 illustrated in FIG. 4, variation in appearance of the virtual images with changes in the eye height of the driver 500 will be described. As a condition, the position, angle, and the like of the magnifying mirror 140 are fixed. The description will be made on a case where only the eye height of the driver 500 is changed. The spatial positions at which the near virtual image area 400a and far virtual image area 400b are displayed do not vary with changes in the eye height of the driver 500.

FIG. 5A illustrates a case where the eye position of the driver 500 has moved to the eye position of the driver 500L. The eye position of the driver 500L is below the eye position of the driver 500. In FIG. 5A, the near virtual image area 400a is seen at a higher position than the far virtual image area 400b.

FIG. 5B illustrates the case of the eye position of the driver 500 as in FIG. 4. In FIG. 5B, the near virtual image area 400a is seen at the same height as the far virtual image area 400b.

FIG. 5C illustrates a case where the eye position of the driver 500 has moved to the eye position of a driver 500H. The eye position of the driver 500H is above the eye position of the driver 500. In FIG. 5C, the near virtual image area 400a is seen at a lower position than the far virtual image area 400b.

The long-distance adjustment virtual image 420a is seen at a position at which a line segment connecting the long-distance adjustment virtual image 420b and the eye position of the driver 500 intersects the near virtual image area 400a. Thus, for example, due to rising and falling of the eye height of the driver 500, the position of the long-distance adjustment virtual image 420a also rises and falls.

In FIG. 5B, the depression angle of the far virtual image area 400b as seen from the position of the driver 500 equals the depression angle of the near virtual image area 400a. Thus, the driver 500 sees that the height of the far virtual image area 400b equals the height of the near virtual image area 400a.

The appearance of the virtual images of FIGS. 5A and 5C will be compared with FIG. 5B as a reference.

In FIG. 5A, the depression angle of the far virtual image area 400b as seen from the position of the driver 500L is larger than the depression angle of the near virtual image area 400a. Thus, the driver 500L sees the far virtual image area 400b lower than the near virtual image area 400a. In FIG. 5A, the position of the long-distance adjustment virtual image 420a is lower than that in FIG. 5B.

In FIG. 5C, the depression angle of the far virtual image area 400b as seen from the position of the driver 500H is smaller than the depression angle of the near virtual image area 400a. Thus, the driver 500H sees the far virtual image area 400b higher than the near virtual image area 400a. In FIG. 5C, the position of the long-distance adjustment virtual image 420a is higher than that in FIG. 5B.

As above, the height of the long-distance adjustment virtual image 420b relative to the short-distance adjustment virtual image 410a as seen from the driver 500 varies depending on the eye height of the driver 500.

The same effect can be obtained by changing the height of the far virtual image area 400b and the height of the near virtual image area 400a without changing the eye height of the driver 500. Thus, by changing the heights of the virtual image areas 400b and 400a, it is possible to change the height of the long-distance adjustment virtual image 420b relative to the short-distance adjustment virtual image 410a as seen from the driver 500.

The positions of the virtual image areas 400b and 400a depend on the position on the windshield 300 and the incident angle on the windshield 300 of the image light projected from the magnifying mirror 140 onto the windshield 300. Thus, by adjusting the position, angle, or the like of the magnifying mirror 140, it is possible to change the positions of the virtual image areas 400b and 400a.

The magnifying mirror 140 has the function of adjusting the direction in which a virtual image is projected. The magnifying mirror 140 also has the function of adjusting the position at which a virtual image is projected. The magnifying mirror 140 has a function of a virtual image adjuster.

FIG. 5A is equivalent to moving up the far virtual image area 400b and near virtual image area 400a relative to the eyes of the driver 500. FIG. 5C is equivalent to moving down the far virtual image area 400b and near virtual image area 400a relative to the eyes of the driver 500.

By allowing the driver 500 to set the position or angle of the magnifying mirror 140, it is possible to change the heights of the far virtual image area 400b and near virtual image area 400a. This allows the driver 500 to adjust the magnifying mirror 140 so that the short-distance adjustment virtual image 410a and long-distance adjustment virtual image 420b can be seen at the same height.

As such, the short-distance adjustment image 113a and long-distance adjustment image 113b are prepared. Then, the heights at which these adjustment virtual images 410a and 420b are displayed are adjusted. Thereby, it is possible to easily adjust the positional relationship between the near virtual image area 400a and the far virtual image area 400b. In particular, it is possible to easily adjust the positional relationship in the height direction between the near virtual image area 400a and the far virtual image area 400b.

In the first embodiment, the magnifying mirror 140 is adjusted so that the far virtual image area 400b can be seen at a higher position than the near virtual image area 400a as in FIG. 5C. As a rough guide of the adjustment, the magnifying mirror 140 is adjusted so that the height at which the short-distance adjustment virtual image 410a is seen and the height at which the long-distance adjustment virtual image 420b is seen are equal as seen from the driver 500.

Thereby, the far virtual image area 400*b* is located at a higher position than the near virtual image area 400*a* as seen from the driver 500. Thus, the driver 500 can see the far virtual image at a higher position than the near virtual image.

As such, by using the short-distance adjustment image 113*a* and long-distance adjustment image 113*b*, the magnifying mirror 140 is adjusted so that the far virtual image is seen at a higher position than the near virtual image. Thereby, the driver 500 can naturally see the far virtual image and near virtual image.

<Relationship Between Distance and Depression Angle>

Next, a description will be given as to a reason to adjust the magnifying mirror 140 so that the far virtual image area 400*b* can be seen at a higher position than the near virtual image area 400*a*.

Figure 6A:
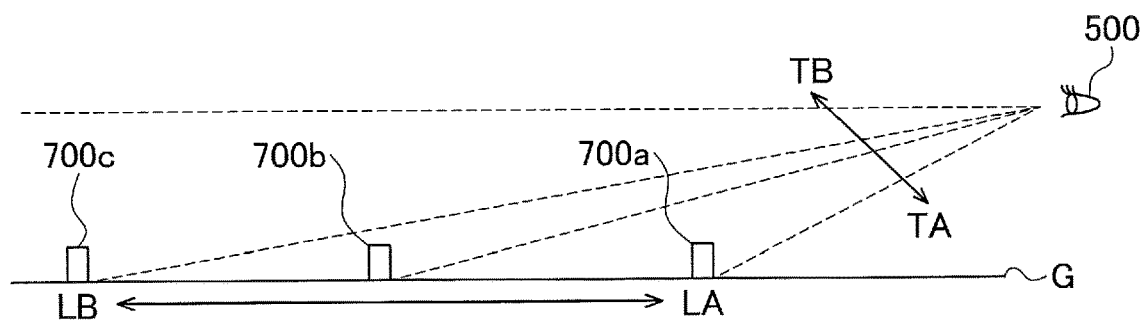
FIGS. 6A and 6B are explanatory diagrams for explaining lines of sight of a driver in the display device according to the first embodiment of the present invention.
Figure 6B:
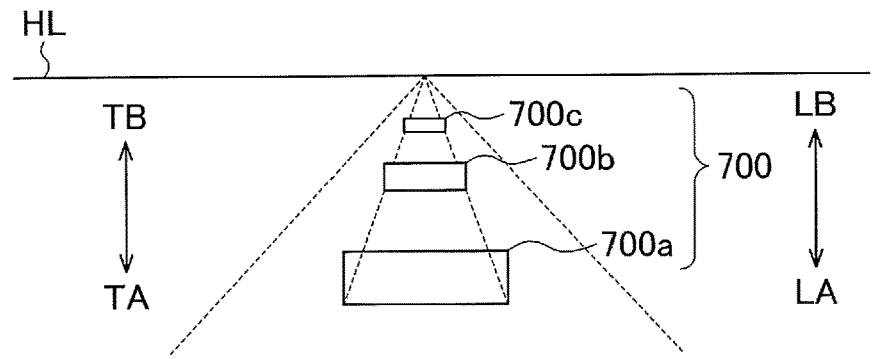

FIGS. 6A and 6B are explanatory diagrams for explaining the line of sight of the driver 500. FIG. 6A is a diagram illustrating the relationship between the distances from the driver 500 to objects 700*a*, 700*b*, and 700*c* and the depression angles. FIG. 6B is a diagram illustrating a forward scene as seen from the driver 500 side.

In FIG. 6A, the objects 700*a*, 700*b*, and 700*c* are located on the ground G (e.g., road surface) in front of the driver 500. The object 700*a* is located at position LA nearer to the driver 500 than the object 700*b*. The object 700*b* is located between the object 700*a* and the object 700*c*. The object 700*c* is located at position LB farther from the driver 500 than the object 700*b*. When the objects 700*a*, 700*b*, and 700*c* on the ground are seen from the driver 500, the farther the object 700*a*, 700*b*, 700*c*, the smaller the depression angle. Depression angle TA is larger than depression angle TB.

FIG. 6B is a diagram in which the objects 700*a*, 700*b*, and 700*c* are seen as a scene seen ahead from the driver 500.

The nearer a seen object 700*a*, 700*b*, 700*c*, the larger the depression angle. Specifically, the depression angle of the object 700*b* is larger than the depression angle of the object 700*c*. The depression angle of the object 700*a* is larger than the depression angle of the object 700*b*.

The smaller the distance to a seen object 700*a*, 700*b*, 700*c*, the lower the position at which the object 700*a*, 700*b*, 700*c* is seen. Specifically, the object 700*b* is seen at a lower position than the object 700*c*. The object 700*a* is seen at a lower position than the object 700*b*.

For the objects 700*a*, 700*b*, and 700*c* having the same height, a farther object is seen at a higher position. There is a horizontal line HL at a position at which the depression angle is 0 degrees.

Thus, the far virtual image area 400*b* is set to be displayed at a higher position than the near virtual image area 400*a*. This allows the driver 500 to see virtual images with a sense close to a real sense of perspective.

Also, when the objects 700*a*, 700*b*, and 700*c* are the same in size, as the distance to a seen object 700*a*, 700*b*, 700*c* decreases, the object 700*a* looks larger than the object 700*b*. The object 700*b* looks larger than the object 700*c*.

A description will be given by taking, as an example, a case where vehicle route guidance is performed using virtual images. When the distance to an intersection is displayed by a virtual image, the display position of the virtual image is changed in accordance with change in the distance to the intersection.

When the intersection is far, the driver 500 sees the intersection at a high position. When the intersection is near, the driver 500 sees the intersection at a low position.

Likewise, when the intersection is far, the virtual image is displayed so that the driver 500 can see the virtual image at a high position. When the intersection is near, the virtual image is displayed so that the driver 500 can see the virtual image at a low position.

Thus, the virtual image display device 100 is adjusted so that the position of the far virtual image area 400*b* is higher than the position of the near virtual image area 400*a*, as seen from the driver 500. For example, the distances to the virtual images and the heights of the virtual image areas 400 are adjusted so that they are seen as in the case of looking from the driver 500H of FIG. 5C.

Thereby, depending on the distance to the virtual image, a far virtual image is seen on an upper side. A near virtual image is seen on a lower side. Also, depending on the distance to the virtual image, a far virtual image is displayed small. A near virtual image is displayed large. These allow the driver 500 to see the objects 700 with a natural sense of perspective.

<Adjustment Procedure>

Next, the adjustment of the display positions of the virtual images in the virtual image display device 100 will be described.

For example, when the driver 500 changes from one to another and they have different bodies, the eye position of the driver 500 may change. The adjustment of the display positions of the virtual images is assumed to be performed in such a case.

The virtual image display device 100 is in a state in which the adjustment can be performed, until receiving an indication of adjustment completion from the driver 500. This state will be referred to below as the "adjustment mode." It may enter the adjustment mode as needed according to an operation or setting by the driver 500

In the adjustment mode, the virtual image display device 100 moves the screen 120 to the position of the near virtual image screen 120*a*. The short-distance adjustment image 113*a* illustrated in FIG. 3A is projected onto the near virtual image screen 120*a*. Then, the virtual image display device 100 temporarily stops the projection of the short-distance adjustment image 113*a*.

The virtual image display device 100 then moves the screen 120 to the position of the far virtual image screen 120*b*. The long-distance adjustment image 113*b* illustrated in FIG. 3B is projected onto the far virtual image screen 120*b*. Then, the virtual image display device 100 temporarily stops the projection of the long-distance adjustment image 113*b*.

These actions are repeated, thereby alternating the projection of the short-distance adjustment image 113*a* and the projection of the long-distance adjustment image 113*b*. By increasing the frequency of repetition of the actions, the driver 500 is allowed to substantially simultaneously see the short-distance adjustment virtual image 410*a* and long-distance adjustment virtual image 420*b*.

During this time, the driver 500 adjusts the position or angle of the magnifying mirror 140. The driver 500 performs the adjustment so that the short-distance adjustment virtual image 410*a* and long-distance adjustment virtual image 420*b* are at the same height.

Thus, it is desirable that the short-distance adjustment virtual image 410*a* and long-distance adjustment virtual image 420*b* can be seen as simultaneously as possible. The driver 500 may perform the adjustment after changing the height of the driver's seat, the inclination of the backrest, or the like. It is desirable that the posture of the driver 500 when the virtual image areas 400*a* and 400*b* are seen be the same as that during driving.

The short-distance adjustment virtual image 410a is displayed in the upper part of the near virtual image area 400a. The long-distance adjustment virtual image 420b is displayed in the lower part of the far virtual image area 400b. By making the display heights of the short-distance adjustment virtual image 410a and long-distance adjustment virtual image 420b coincide with each other, the position of the far virtual image area 400b becomes higher than the position of the near virtual image area 400a. The height at which the short-distance adjustment virtual image 410a is seen by the driver 500 and the height at which the long-distance adjustment virtual image 420b is seen by the driver 500 are made to coincide with each other.

The position and angle of the magnifying mirror 140 are controlled by means of, for example, an input device, such as a switch, dial, or the like placed at the steering wheel or the like; or the position and angle of the magnifying mirror 140 are controlled, for example, through voice input or the like.

Both the position and angle of the magnifying mirror 140 may be moved in conjunction with a switch or the like. For example, for the sake of simplicity, only the position of the magnifying mirror 140 may be controlled; or only the angle of the magnifying mirror 140 may be controlled.

For example, the driver 500 may move the display positions of the virtual images in an up-down direction; or the driver 500 may change the depression angles to the virtual images. For example, for the driver 500 of the vehicle, "up-down direction" refers to a direction perpendicular to the road surface.

<Setting of Display Positions of Adjustment Images>

The position in the height direction of the short-distance adjustment image 113a and the position in the height direction of the long-distance adjustment image 113b are set to different positions in the input image format 112. The position in the height direction of the short-distance adjustment image 113a is set to a position higher than the position in the height direction of the long-distance adjustment image 113b.

For comparison, a case where the short-distance adjustment image 113a and long-distance adjustment image 113b are set at the same height in the input image format 112 will be described.

In this case, when the adjustment is made so that the short-distance adjustment virtual image 410a and long-distance adjustment virtual image 420b are at the same height, the near virtual image area 400a and far virtual image area 400b are seen at the same height. The virtual image areas 400 are seen at the same height (direction) regardless of the distances to the virtual images.

Such a setting is effective when the virtual image display device 100 is basically designed so that the depression angles of the centers of the virtual image areas 400 are small, for example. By making the depression angles small, it is possible to reduce the difference between the positions of seen objects 700 in the vertical direction with respect to the difference between the distances to the objects 700. Specifically, in the forward scene as seen from the driver 500 side illustrated in FIG. 6B, the distances between the objects 700a, 700b, and 700c in the vertical direction are reduced.

Next, a case where the short-distance adjustment image 113a is set at a higher position than the long-distance adjustment image 113b in the input image format 112 will be described.

In this case, when the adjustment is made so that the short-distance adjustment virtual image 410a and long-distance adjustment virtual image 420b are at the same height, the near virtual image area 400a is seen at a lower position than the far virtual image area 400b.

Such a setting is effective when the virtual image display device 100 is basically designed so that the depression angles of the centers of the virtual image areas 400 are large, for example. By making the depression angles large, it is possible to increase the difference between the positions of seen objects 700 in the vertical direction with respect to the difference between the distances to the objects 700. Specifically, in the forward scene as seen from the driver 500 side illustrated in FIG. 6B, the distances between the objects 700a, 700b, and 700c in the vertical direction are increased.

As above, the difference in height between the short-distance adjustment image 113a and the long-distance adjustment image 113b in the input image format 112 affects the difference in height between the near virtual image area 400a and the far virtual image area 400b. Thus, the height of the short-distance adjustment image 113a and the height of the long-distance adjustment image 113b can be set in view of the difference between the height of the far virtual image and the height of the near virtual image, or the like. This is set as a basic design of the virtual image display device 100.

The relationship between the height of the short-distance adjustment image 113a and the height of the long-distance adjustment image 113b can be experimentally determined so that a driver 500 having an average body can see the near virtual image and far virtual image with a natural sense of perspective.

The adjustment images 113a and 113b thus generated are provided in the virtual image display device 100. Each driver 500 can adjust the relationship between the height of the far virtual image and the height of the near virtual image by using the adjustment images 113a and 113b.

<Relationship Between Virtual Images and Objects>

Next, a case where virtual images displayed by the virtual image display device 100 are superimposed on a scene to provide Augmented reality (AR) display will be described. Augmented reality (AR) is a technique that superimposes and displays digital information on a real scene. AR display is a display provided by superimposing digital information on a real scene using AR technology.

The relationship between virtual images, a scene, the viewpoint of the driver 500 in this case will be described.

Figure 7:
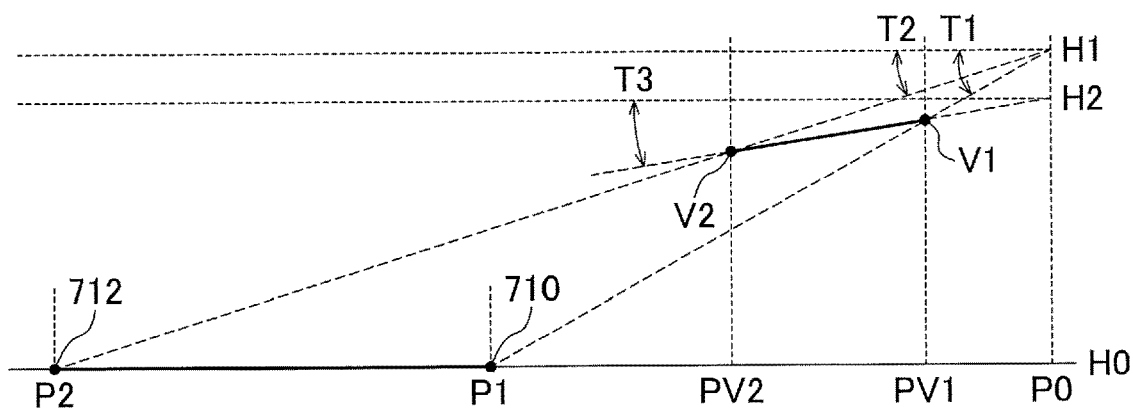
FIG. 7 is an explanatory diagram for explaining the relationship between virtual images of the display device according to the first embodiment of the present invention and a scene.

FIG. 7 is an explanatory diagram for explaining the relationship between virtual images displayed by the virtual image display device 100 and a scene.

Positions P0, P1, P2, PV1, and PV2 represent positions on the ground in front of the driver 500. Heights H0, H1, and H2 represent distances from the ground. That is, positions P0, P1, P2, PV1, and PV2 are positions in a horizontal direction. Heights H0, H1, and H2 are positions in a vertical direction. To facilitate description, the description will be made on the assumption that positions P0, P1, P2, PV1, and PV2 are linearly located.

Position P0 is the position of the driver 500. Position P0 is also the position of the virtual image display device 100. Position P1 is the position of a near object 710. Position P2 is the position of a far object 712. Here, the objects 710 and 712 are illustrated as point-like objects. The objects 710 and 712 are located at height H0.

The objects 710 and 712 are subjected to AR display. Position PV1 is the position of a near virtual image V1. Position PV2 is the position of a far virtual image V2. The virtual images V1 and V2 are virtual images displayed by the virtual image display device 100.

The virtual images V1 and V2 are illustrated as point-like virtual images. Thus, when they are distinguished from virtual images VN and VF to be described later, they are described as point-like virtual images V1 and V2.

Height H0 is the position of the ground. Height H1 is the eye position of the driver 500. Height H2 is a position (reference height) serving as a reference for a virtual image display direction of the virtual image display device 100. Reference height H2 is a position at which a straight line passing through the near virtual image V1 and far virtual image V2 intersects a line from position P0 perpendicular to the ground (road surface).

A depression angle T3 of the virtual image display device 100 is a depression angle at which the near virtual image V1 and far virtual image V2 are seen from height H2. The depression angle at which the near object 710 is seen from the eye position (P0, H1) of the driver 500 is a short-distance depression angle T1. The depression angle at which the far object 712 is seen from the eye position (P0, H1) of the driver 500 is a long-distance depression angle T2.

The virtual image V1 is at a point where a straight line at the depression angle T1 passing through the eye position (P0, H1) of the driver 500 intersects a line from position PV1 perpendicular to the ground (road surface). The virtual image V2 is at a point where a straight line at the depression angle T2 passing through the eye position (P0, H1) of the driver 500 intersects a line from position PV2 perpendicular to the ground (road surface). The straight line connecting the virtual image V1 with the virtual image V2 coincides with the straight line at the depression angle T3 passing through the position (P0, H2) of the virtual image display device 100.

Here, the visual angle of the virtual image display device 100 is omitted, and thus the virtual images V1 and V2 are located in the same direction (depression angle T3) as seen from the virtual image display device 100. The virtual images V1 and V2 are described as points on a straight line. However, the virtual images V1 and V2 actually have a dimension in the vertical direction. Thus, the virtual image display device 100 has a visual angle that allows the virtual images V1 and V2 to be displayed.

Height H1 depends on how the depression angle T3 is set within the visual angle of the virtual image display device 100. For example, when height H1 is determined with the objects 710 and 712 on the ground as references, the depression angle T3 can be set to be the angle of the lower end of the visual angle of the virtual image display device 100. Within the visual angle of the virtual image display device 100, any angle can be set as the depression angle T3 of the virtual image display device 100.

With the positional relationship as described above, the virtual image display device 100 can display virtual images between the near virtual image V1 and the far virtual image V2. The virtual images displayed between the near virtual image V1 and the far virtual image V2 are displayed in AR with respect to objects located between the near object 710 and the far object 712. The virtual images can be superimposed and displayed on the objects.

Further, by associating the position at which the AR display is performed with the contents of the display, it is possible to provide AR display that is easy for the driver 500 to see.

Near virtual image position PV1 is a foot of a perpendicular from the near virtual image V1 to the ground (ground surface). Far virtual image position PV2 is a foot of a perpendicular from the far virtual image V2 to the ground (ground surface).

Since the depression angle of a straight line connecting the virtual image V1 and the virtual image V2 is a few degrees, the depression angle can be approximated as zero. Thus, the difference between the distance from the virtual image display device 100 to a virtual image and the distance from position P0 of the virtual image display device 100 to the position of the virtual image on the ground is slight.

Thus, the distance from the position (P0, H2) of the virtual image display device 100 to the near virtual image V1 is approximated as the distance from viewpoint position P0 to near virtual image position PV1. The distance from the position (P0, H2) of the virtual image display device 100 to the far virtual image V2 is approximated as the distance from viewpoint position P0 to far virtual image position PV2. In the following example, the distances on the ground are used to simplify calculation.

<Specific Relationship Between Virtual Images and Objects>

Regarding the virtual images and objects illustrated in FIG. 7, a specific example will now be described.

For example, the eye height of the driver 500 in a standard-sized passenger automobile is 1.2 m on average. Standard-sized passenger automobiles are 2 m or less in height. Thus, for example, height H1 is taken as 1.2 m. The distance (P1-P0) from position P0 of the driver 500 to position P1 of the near object 710 is taken as 20 m. Likewise, the distance (P2-P0) from position P0 of the driver 500 to position P2 of the far object 712 is taken as 50 m.

The depression angle T1 from the eye position (P0, H1) of the driver 500 to the near object 710 is about 3.43 degrees. The depression angle T2 from the eye position (P0, H1) of the driver 500 to the far object 712 is about 1.37 degrees.

It is assumed that virtual image position PV1 of the near virtual image V1 displayed by the virtual image display device 100 is 2 m from position P0. It is assumed that virtual image position PV2 of the far virtual image V2 displayed by the virtual image display device 100 is 20 m from position P0.

When the relationship in FIG. 7 is satisfied, the depression angle T3 of the virtual image display device 100 is about 1.15 degrees. Likewise, height H2 is about 1.12 m.

The difference between an angle at which the near virtual image V1 is seen from the eye position (P0, H1) of the driver 500 and an angle at which the far virtual image V2 is seen from the eye position (P0, H1) of the driver 500 is the difference (T1-T2) between the depression angles of the two. This angle difference is the difference between the angle of the direction in which the virtual image V1 is seen from the driver 500 and the angle of the direction in which the virtual image V2 is seen from the driver 500. The angle difference in this case is about 2.06 degrees.

In this example, the driver 500 adjusts the virtual image display device 100 so that the difference between the display angle of the near virtual image V1 and the display angle of the far virtual image V2 is about 2.06 degrees.

<Example of Near Virtual Image and Far Virtual Image>

Figure 8:
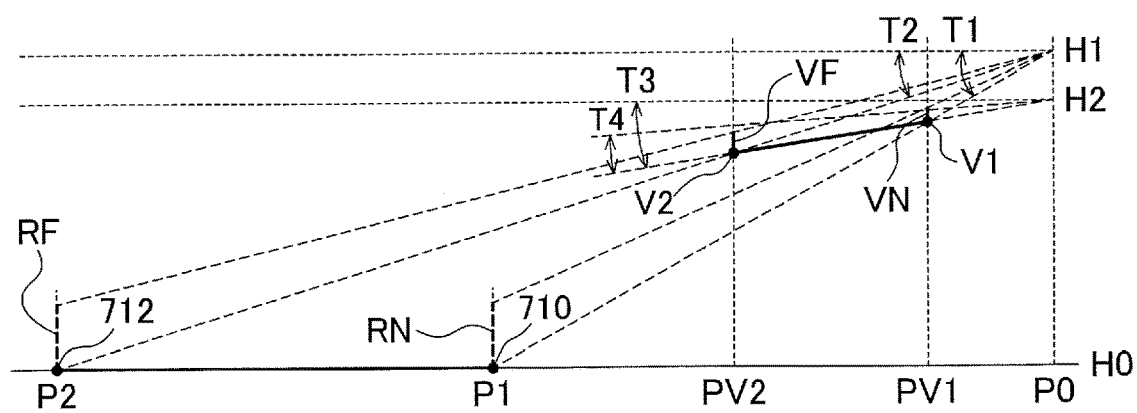
FIG. 8 is an explanatory diagram for explaining the relationship between virtual images of the display device according to the first embodiment of the present invention and objects subjected to AR display.

FIG. 8 is an explanatory diagram for explaining the relationship between virtual images displayed by the virtual image display device 100 and objects subjected to AR display.

A case where the virtual image display device 100 performs AR display on the near object 710 and far object 712 will be described. Specifically, a case where with respect to the objects 710 and 712, virtual images are displayed at the corresponding positions P1 and P2 will be described. Elements that are the same as those in FIG. 7 are denoted by the same reference characters, and the differences will be described.

The visual angle T4 is a visual angle of the virtual image display device 100. The visual angle T4 is a visual angle indicating a virtual image range in the vertical direction that can be seen from height H2. The visual angle T4 is an angle formed by the upper end and lower end of the range within which the virtual image display device 100 located at height H2 can display virtual images. Specifically, the visual angle T4 is the difference between the depression angles of the upper end and lower end of the range within which virtual images from the position of height H2 can be displayed. Here, the position of the near virtual image V1 and the position of the far virtual image V2 are located at the lower end of the visual angle T4 of the virtual image display device 100.

A case where the driver 500 looks from height H1 will be described.

When an AR image RN is displayed at position P1 of the near object 710, the virtual image display device 100 displays a virtual image VN at the position of the point-like near virtual image V1. When an AR image RF is displayed at position P2 of the far object 712, the virtual image display device 100 displays a virtual image VF at the position of the point-like far virtual image V2.

Here, when the near AR image RN and far AR image RF have the same size (height), the ratio of the height of the near virtual image VN to the visual angle T4 is different from the ratio of the height of the far virtual image VF to the visual angle T4. In this example, the near virtual image VN is displayed over the range of the visual angle T4. On the other hand, the far virtual image VF is displayed over a range smaller than the range of the visual angle T4.

In view of the above, in a case where the vehicle approaches the objects 710 and 712 subjected to AR display, or other cases, it is possible to provide natural AR display by changing the display positions of the virtual images VN and VF and the sizes of the virtual images VN and VF. The above has described a case where AR display is provided at the nearest and farthest positions at which the virtual image display device 100 can provide AR display. However, the AR display is possible at positions between them.

In FIG. 8, the position of the near virtual image V1 and the position of the far virtual image V2 are located at the lower end of the visual angle T4 of the virtual image display device 100. However, the point-like virtual images V1 and V2 need not be located at the lower ends of the virtual images VN and VF.

For example, the point-like virtual images V1 and V2 may be located at a center or upper end of the visual angle T4 of the virtual image display device 100. In this case, the relationship between the objects 710 and 712 subjected to AR display and the AR images RN and RF displayed as virtual images is made satisfy the above relationship between the positions and sizes of the virtual images VN and VF.

<Positions at which Adjustment Virtual Images are Displayed>

The display positions of the short-distance adjustment image 113a and long-distance adjustment image 113b displayed by the image display unit 110 will now be described.

In FIG. 3A, the short-distance adjustment image 113a is displayed on the upper side of the input image format 112 of the control signal $S_3$. In FIG. 3B, the long-distance adjustment image 113b is displayed on the lower side of the input image format 112 of the control signal $S_3$.

As illustrated in FIG. 4, the short-distance adjustment image 113a is displayed as the short-distance adjustment virtual image 410a. The long-distance adjustment image 113b is displayed as the long-distance adjustment virtual image 420b. The short-distance adjustment virtual image 410a is seen above the long-distance adjustment virtual image 420b.

Setting is made so that the angle difference between the directions in which the short-distance adjustment virtual image 410a and long-distance adjustment virtual image 420b are seen from the driver 500 is equal to the difference between the angles at which the near virtual image V1 and far virtual image V2 are displayed. In the aforementioned example, the difference between the angles at which the near virtual image V1 and far virtual image V2 are displayed is about 2.06 degrees.

The difference (referred to below as the display angle difference) between the angles at which the near virtual image V1 and far virtual image V2 are displayed is determined with the visual angle determined by the design of the virtual image display device 100 as a reference. In the aforementioned example, the near virtual image V1 is displayed about 2.06 degrees downward from the far virtual image V2.

The display positions of the short-distance adjustment image 113a and long-distance adjustment image 113b are determined so that the angle difference between the directions in which the short-distance adjustment virtual image 410a and long-distance adjustment virtual image 420b are seen from the driver 500 is equal to the display angle difference. In this case, the short-distance adjustment image 113a is located above the long-distance adjustment image 113b.

By using the short-distance adjustment image 113a and long-distance adjustment image 113b thus determined, the driver 500 adjusts the display positions of the virtual images V1 and V2. The adjustment is made so that the short-distance adjustment virtual image 410a and long-distance adjustment virtual image 420b are at the same height. The near virtual image V1 is seen at a position lower than that of the far virtual image V2 by an amount corresponding to the display angle difference.

A case where the visual angle of the virtual image display device 100 in the vertical direction is ±3 degrees and the visual angle does not depend on the distance of the virtual image will be described as an example.

The vertical width (length in the vertical direction) of the input image format 112 corresponds to ±3 degrees of the visual angle. Thus, one sixth of the vertical width of the input image format 112 corresponds to about 1 degree of the visual angle. In the aforementioned example, the difference between the angles at which the short-distance adjustment virtual image 410a and long-distance adjustment virtual image 420b are displayed is about 2 degrees.

To make the difference between the angles at which they are displayed equal to about 2 degrees, the difference between the positions of the short-distance adjustment image 113a and long-distance adjustment image 113b in the vertical direction is set to about one third of the vertical width of the input image format 112. In the area of the input image format 112, the short-distance adjustment image 113a is at a higher position than the long-distance adjustment image 113b.

Then, the display positions of the virtual images are adjusted using the magnifying mirror 140 or the like so that the short-distance adjustment virtual image 410a and long-distance adjustment virtual image 420b can be seen at the same position from height H1. Thereby, it is possible to adjust the display positions of the virtual images while maintaining the difference between the angles at which the near virtual image V1 and far virtual image V2 are displayed, as illustrated in FIG. 7.

The above example, the visual angle determined by the design of the virtual image display device 100 has been used as a reference. However, it may be experimentally determined as described below.

First, the short-distance adjustment image 113a and long-distance adjustment image 113b are set at the same height position in the input image format 112. Then, an adjustment is made so that the short-distance adjustment virtual image 410a and long-distance adjustment virtual image 420b are seen at the same height from height H2. The magnifying mirror 140 or the like is used for the adjustment. When the virtual image display device 100 is placed as designed, the short-distance adjustment virtual image 410a and long-distance adjustment virtual image 420b are seen at the same height from height H2 in the initial state.

Next, one or both of the short-distance adjustment image 113a and long-distance adjustment image 113b are adjusted in height so that the short-distance adjustment virtual image 410a and long-distance adjustment virtual image 420b are at the same height when seen from height H1. The difference in height between the short-distance adjustment image 113a and long-distance adjustment image 113b at this time is recorded.

The short-distance adjustment image 113a and long-distance adjustment image 113b subjected to the height adjustment are taken as experimentally determined adjustment images. Also, the recorded difference in height between the adjustment images 113a and 113b is maintained. In this way, it is possible to determine the heights of the short-distance adjustment image 113a and long-distance adjustment image 113b in the area of the input image format 112.

Here, in the above-described experimental determination, what sees the short-distance adjustment virtual image 410a and long-distance adjustment virtual image 420b may, but need not, be a person. For example, a camera is placed at the position from which the adjustment virtual images 410a and 410b should be seen. Then, by analyzing the camera image, it is possible to measure the positions of the adjustment virtual images 410a and 410b and adjust the heights of the adjustment images 113a and 113b.

The design items of the optical system of the virtual image display device 100 include the size of the screen 120, characteristics of the screen 120, the magnification ratio of the magnifying mirror 140, and the like. Depending on the design of the optical system, a visual angle of the near virtual image area 400a and a visual angle of the far virtual image area 400b may be different. In such a case, for example, it is possible to measure a visual angle of the near virtual image area 400a and a visual angle of the far virtual image area 400b, and set images appropriate for the respective visual angles.

FIRST MODIFICATION EXAMPLE

A modification example of the adjustment virtual images used for adjustment of the virtual image positions.

Figure 9A:
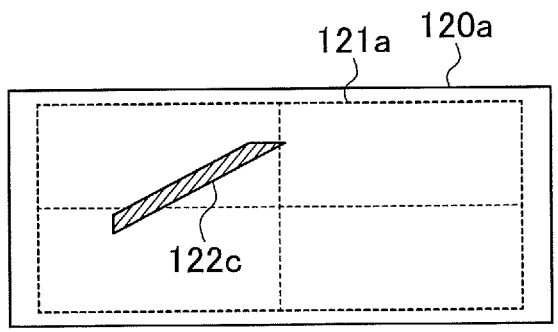
FIGS. 9A and 9B are explanatory diagrams illustrating an example of adjustment images for virtual image positions in a display device according to a first modification example of the first embodiment of the present invention.
Figure 9B:
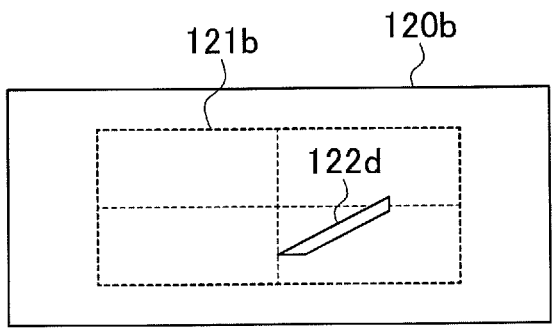

FIGS. 9A and 9B are explanatory diagrams illustrating an example of the adjustment images for the virtual image positions. FIG. 9A is an example in which an adjustment image is projected on the near virtual image screen 120a. FIG. 9B is an example in which an adjustment image is projected on the far virtual image screen 120b. FIGS. 9A and 9B are views as seen by the driver 500 through the magnifying mirror 140.

An adjustment intermediate image 122c for short distance is projected on the upper part of the short-distance projection area 121a in the area of the near virtual image screen 120a. The short-distance adjustment intermediate image 122c is an oblique figure.

In FIG. 9A, the short-distance adjustment intermediate image 122c is a strip-shaped figure. The short-distance adjustment intermediate image 122c extends from a center portion of the left side toward a center portion of the upper side. The upper edge of the short-distance adjustment intermediate image 122c is an edge parallel to the horizontal direction. The upper edge of the short-distance adjustment intermediate image 122c has a shape obtained by cutting in the horizontal direction. The upper edge of the short-distance adjustment intermediate image 122c is located in a center area of the short-distance projection area 121a in the left-right direction.

An adjustment intermediate image 122d for long distance is projected on the lower part of the long-distance projection area 121b in the area of the far virtual image screen 120b. The long-distance adjustment intermediate image 122d is an oblique figure.

In FIG. 9B, the long-distance adjustment intermediate image 122d is a strip-shaped figure. The long-distance adjustment intermediate image 122d extends from a center portion of the right side toward a center portion of the lower side. The lower edge of the long-distance adjustment intermediate image 122d is an edge parallel to the horizontal direction. The lower edge of the long-distance adjustment intermediate image 122d has a shape obtained by cutting in the horizontal direction. The lower edge of the long-distance adjustment intermediate image 122d is located in a center area of the long-distance projection area 121b in the left-right direction.

Figure 10A:
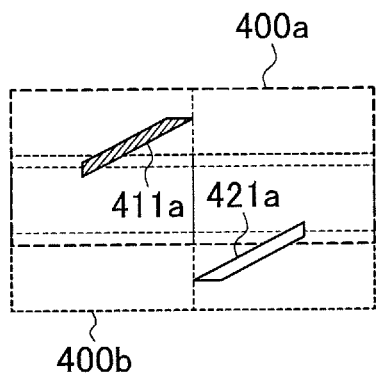
FIGS. 10A to 10C are each explanatory diagram of a case where virtual images of the display device according to the first modification example of the first embodiment of the present invention are viewed from a driver.
Figure 10B:
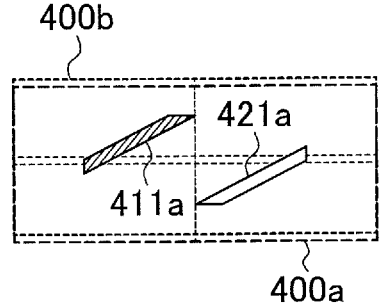
Figure 10C:
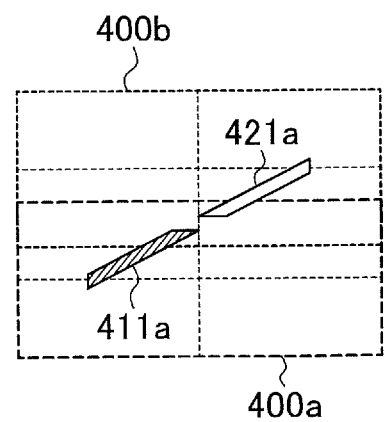

FIGS. 10A to 10C are explanatory diagrams illustrating an example of virtual images as seen from the driver 500. FIGS. 10A to 10C are diagrams illustrating virtual images in the virtual image area 400 visible from the driver 500.

In FIG. 10A, the height of the near virtual image area 400a is higher than that of the far virtual image area 400b. In FIG. 10B, the height of the near virtual image area 400a is equal to that of the far virtual image area 400b. In FIG. 10C, the height of the near virtual image area 400a is lower than that of the far virtual image area 400b.

Image light projected onto the screens 120a and 120b of FIGS. 9A and 9B is reflected by the magnifying mirror 140 and then passes through the windshield 300. Then, the image light is seen as virtual images by the driver 500.

The area of the far virtual image area 400b is larger than the area of the near virtual image area 400a. However, when the visual angle of the far virtual image area 400b is equal to the visual angle of the near virtual image area 400a as seen from the driver 500, their apparent sizes are equal. Thus, in FIGS. 10A to 10C, for convenience, the far virtual image area 400b and near virtual image area 400a are illustrated as being equal in size.

FIG. 10A illustrates a case where the height of the near virtual image area 400a is higher than the height of the far virtual image area 400b. This corresponds to the case of FIG. 5A where the eye height of the driver 500 is low. In this case, an adjustment virtual image 411a for short distance is seen at a higher position than an adjustment virtual image 421a for long distance.

FIG. 10B illustrates a case where the height of the near virtual image area 400a is equal to the height of the far virtual image area 400b. This corresponds to the case of the driver 500 of FIG. 5B. In this case, the short-distance adjustment virtual image 411a is seen at the same height as the long-distance adjustment virtual image 421a.

FIG. 10C illustrates a case where the height of the near virtual image area 400a is lower than the height of the far virtual image area 400b. This corresponds to the case of FIG. 5C where the eye height of the driver 500 is high. In this case, the short-distance adjustment virtual image 411a is seen at a lower position than the long-distance adjustment virtual image 421a.

Further, in FIG. 10C, the short-distance adjustment virtual image 411a and long-distance adjustment virtual image 421a are seen as being aligned in a straight line. Specifically, the short-distance adjustment virtual image 411a and long-distance adjustment virtual image 421a form a strip-shaped figure extending from the lower left toward the upper right.

Thereby, it is possible to easily recognize that the height of the near virtual image area 400a is lower than the height of the far virtual image area 400b. Further, since the short-distance adjustment virtual image 411a and long-distance adjustment virtual image 421a are oblique linear figures, in addition to the adjustment of the positions of the virtual image areas 400a and 400b in the height direction, it is possible to easily perform adjustment of the positions in the lateral direction.

For example, when it is required that the near virtual image area 400a and far virtual image area 400b be at the same height, the positions of the adjustment images 113a and 113b are adjusted so that the short-distance adjustment virtual image 411a and long-distance adjustment virtual image 421a are aligned in a straight line in the case of FIG. 10B. In this case, the short-distance adjustment intermediate image 122c and long-distance adjustment intermediate image 122d projected on the screen 120 are also aligned in a straight line.

In the example of FIGS. 9A, 9B, and 10A to 10C, the short-distance adjustment virtual image 411a and long-distance adjustment virtual image 421a are strip-shaped figures rising to the right as seen from the driver 500. However, the adjustment virtual images 411a and 421a are not limited to the figures. For example, the short-distance adjustment virtual image 411a and long-distance adjustment virtual image 421a may form multiple point-like figures aligned on a straight line.

When the eye position of the driver 500 is displaced leftward or rightward, the displacement of the eye position of the driver 500 affects the positional relationship between the short-distance adjustment virtual image 411a and long-distance adjustment virtual image 421a.

Thus, during the adjustment of the display positions of the virtual images, the head position may be limited. For example, the display positions of the virtual images are adjusted with the head of the driver 500 against a headrest of the driver seat. The headrest is pillow-shaped, is mounted on the upper part of a backrest of the seat, and functions to support the head.

The head position need not be strictly positioned. It is sufficient that the head position be positioned so that the driver 500 can see the displayed virtual images from the front.

Thus, for example, in the near virtual image area 400a and far virtual image area 400b, the respective adjustment virtual images are displayed at the same position in the lateral direction.

For example, the adjustment virtual images are displayed at centers of the virtual image areas 400a and 400b in the lateral direction. The driver 500 adjusts the head position of the driver 500 so that the adjustment virtual images in the near virtual image area 400a and far virtual image area 400b can be seen at the same position in the lateral direction. After adjusting the head position in the lateral direction in this manner, the driver 500 adjusts the display positions of the virtual images.

When the driver 500 changes from one to another, the eye position of the driver 500 may be displaced from a position designed as a reference, due to the difference between their body sizes or the like. Even in such a case, the driver 500 can easily adjust the display positions of the virtual images.

The eye position of the driver 500 moves depending on adjustment of the height of the seat, the forward tilting posture during driving, the inclination of a backrest of the seat, or the like. In such a case, to detect the eye position of the driver 500, it is necessary to accurately detect not only the eye height but also the eye position in the depth direction. Thus, if the eye position cannot be three-dimensionally detected, it is difficult to automatically adjust the magnifying mirror 140 depending on the eye position.

In the virtual image display device 100, the display positions of the virtual images are adjusted through operation by the driver 500. This eliminates the need for detection of the eye position necessary for the automatic adjustment. This eliminates the need for a camera or sensor for detecting the eye position. Further, the virtual image display device 100 displays the adjustment images 113 for adjustment of the display positions of the virtual images. This eliminates the need for complicated arithmetic processing or the like for the automatic adjustment.

When a virtual image from the virtual image display device 100 is displayed using the windshield 300, the display state of the virtual image is affected by the windshield 300. The shape, inclination state, or the like of the windshield 300 varies depending on the type of the vehicle. Thus, when virtual image display devices 100 are installed in different types of vehicles, it is necessary to optimize conditions under which the virtual images are displayed. In a method that detects the eye position of the driver 500 and automatically controls the magnifying mirror 140, it is necessary to change arithmetic equations, coefficients used in calculation, or the like for controlling the magnifying mirror 140, depending on the type of the vehicle.

The virtual image display device 100 need not be changed depending on the type of the vehicle after being basically designed. Since the driver 500 himself/herself adjusts the appearance of the virtual images, it is not necessary to set arithmetic equations, coefficients used in calculation, or the like depending on the type of the vehicle. Thus, the virtual image display device 100 can more easily applied to various types of vehicles.

To display the near virtual image through the near virtual image screen 120a and the far virtual image through the far virtual image screen 120b, it is possible to move the screen 120 and alternately display the near virtual image and the far virtual image. It is also possible to divide the screen 120 into two halves, and place one of them as the near virtual image screen 120a and the other as the far virtual image screen 120b. By dividing the screen 120 and using the divided screens, it is possible to simultaneously display the near virtual image and far virtual image.

As an example of the adjustment images 113, the arrows have been used. However, they are not limited to these figures.

The adjustment images 113 are images for adjusting the display positions of the virtual images. As the adjustment images 113, simple lines, points, marks, or the like may be used. The adjustment images 113 may be any images that allow the driver 500 to recognize the difference in position between the far adjustment virtual image and the near adjustment virtual image. Also, for example, the display positions of the virtual images need not be strictly adjusted.

The display positions of virtual images may be adjusted by displaying an adjustment virtual image for middle distance in addition to the long-distance adjustment virtual image and short-distance adjustment virtual image. When virtual images are displayed at two or more different distances, adjustment virtual images are displayed. Then, the driver 500 adjusts the display positions of the virtual images while seeing the adjustment virtual images.

As a method of adjusting the display positions of the virtual images, a method of adjusting the position and angle of the magnifying mirror 140 has been described. However, this method is not mandatory.

The display positions of the virtual images can also be adjusted by shifting the position of the screen 120 in the up-down direction between the short distance time and the long distance time. The display positions of the virtual images can also be adjusted by shifting the image light emitted from the light source unit 111 in the up-down direction between the short distance time and the long distance time. The display positions of the virtual images may also be adjusted by controlling a combination of two or more of the magnifying mirror 140, screen 120, and light source unit 111.

<Method of Adjusting Display Positions of Virtual Images>

A method of adjusting the display positions of the virtual images will now be described with reference to flowcharts.

Figure 11:
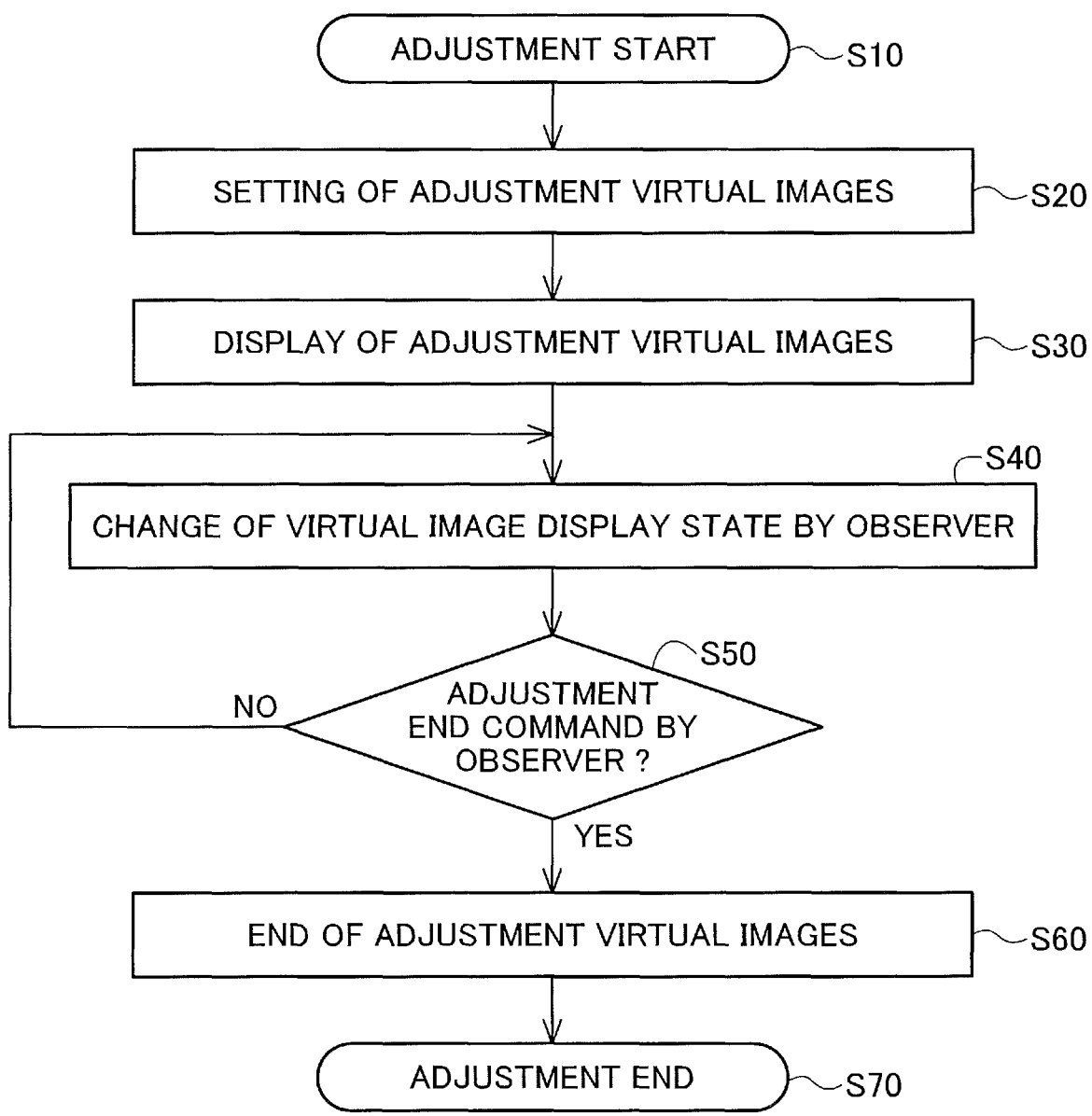
FIG. 11 is a flowchart of an adjustment method according to the first embodiment of the present invention for displaying virtual images.

FIG. 11 is a flowchart of the method of adjusting the display positions of the virtual images.

In step S10, the adjustment of the display positions of the virtual images is started. An observer (for example, driver 500) who will adjust the display positions of the virtual images operates the virtual image display device 100 to set it into the adjustment mode, thereby starting the adjustment illustrated in FIG. 11.

In step S20, the adjustment images 113 are set. Specifically, as illustrated in FIGS. 3A to 3D, the adjustment images 113 corresponding to the distances at which the virtual images are displayed are selected. Then, the display positions of the adjustment images 113 in the area of the screen 120 are set.

In step S30, display of the adjustment virtual images 410 and 420 is started using the selected adjustment images 113. Thereby, the observer (for example, driver 500) can see the adjustment virtual images 410 and 420. The process in step S30 will be described later in detail. After the display process of the adjustment images 113 is started in step S30, the method proceeds to step S40.

In step S40, the display positions of the virtual images are changed in accordance with an operation by the observer. This process is performed each time an operation is made by the observer.

In step S50, the observer issues a command to end the adjustment. When the command to end the adjustment is received from the observer, "YES" is selected. Then, the method proceeds to step S60. When no command to end the adjustment is received from the observer, "no" is selected. Then, the method proceeds to step S40.

In step S60, the display of the adjustment virtual images 410 and 420 is ended.

In step S70, the adjustment of the display positions of the virtual images is ended.

In the above example, the start of the adjustment of the display positions of the virtual images is triggered by manual setting into the adjustment mode. However, this way (manual way) is not mandatory.

For example, it is possible that a difference in the observer, such as a difference in the head position of the driver 500, is detected; then, if there is a difference from when the current setting was made, the adjustment is started. It is possible that the adjustment mode is automatically started when a condition for determining a difference in the eye position of the observer is satisfied.

A sensor or the like for determining a difference in the observer (e.g., driver 500) need not detect the eye position of the observer for adjusting the display positions of the virtual images. Thus, it is possible to use a camera for capturing the inside of the vehicle installed for another purpose, a sensor for measuring the weight of the driver, or the like. The camera may be a camera for preventing the driver from falling asleep.

The display process of the adjustment images in step S30 will now be described.

Figure 12:
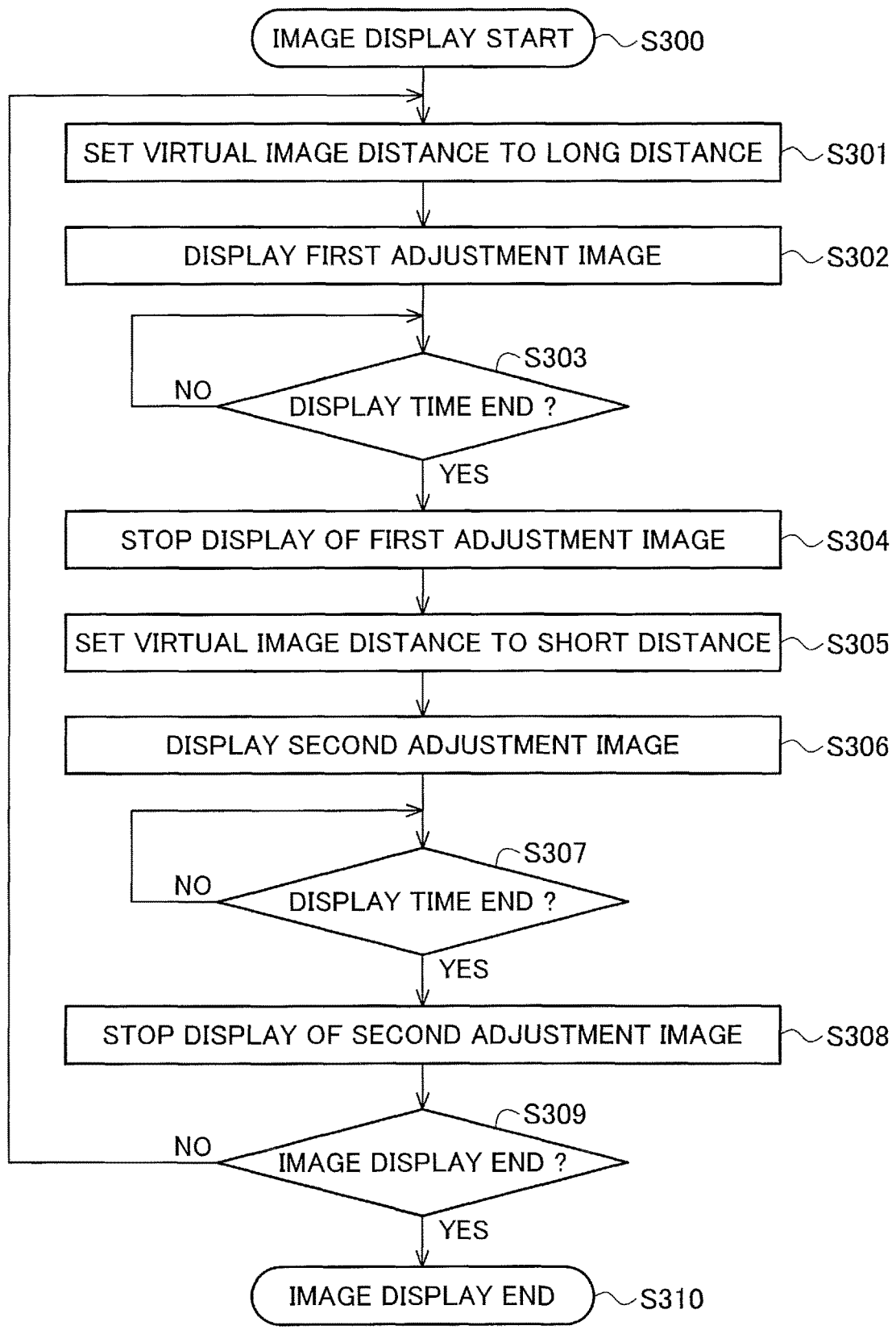
FIG. 12 is a flowchart of a process of displaying adjustment images in the adjustment method according to the first embodiment of the present invention for displaying virtual images.

FIG. 12 is a flowchart of the display process of the adjustment images 113. FIG. 12 details the process of step S30 of FIG. 11. When the method proceeds to step S30 of FIG. 11, step S300 of FIG. 12 is started. The flowchart of FIG. 11 proceeds to step S40, and in parallel, step S300 of FIG. 12 is executed.

In step S300, the display process of the images is started. When the display process of the images is started, the process proceeds to step S301.

In step S301, the distance at which a virtual image is displayed is set to the long distance. This means, for example, that the screen 120 is moved to the position of the screen 120b in FIG. 1.

In step S302, the first adjustment image 113b is displayed. Thereby, the observer can see the virtual image of the first adjustment image 113b in the distance.

In step S303, the time that has elapsed since the first adjustment image 113b was displayed in step S302 is measured. When it exceeds a predetermined time, "YES" is selected, and the process proceeds to step S304. When it does not exceed the predetermined time, "NO" is selected, and the process proceeds to step S303.

In step S304, the display of the first adjustment image 113b is stopped.

In step S305, the distance at which a virtual image is displayed is set to the short distance. This means, for example, that the screen 120 is moved to the position of the screen 120a in FIG. 1.

In step S306, the second adjustment image 113a is displayed. Thereby, the observer can see the virtual image of the second adjustment image 113a in the near distance.

In step S307, the time that has elapsed since the second adjustment image 113a was displayed in step S306 is measured. When it exceeds the predetermined time, "YES" is selected, and the process proceeds to step S308. When it does not exceed the predetermined time, "NO" is selected, and the process proceeds to step S307.

In step S308, the display of the second adjustment image 113a is stopped.

In step S309, it is determined whether the display process of the adjustment images 113a and 113b is required to be ended. When the display process of the images is not to be ended, "NO" is selected, and the process proceeds to step S301. When the display process of the images is to be ended, "YES" is selected, and the process proceeds to step S310. Then, the display process of the images is ended. That is, the flowchart of the display process of the adjustment images 113 of FIG. 12 is ended.

The determination in step S309 as to whether the display process of the images is to be ended depends on whether the process for ending the adjustment virtual images in step S60 of FIG. 11 has been performed. The flowchart of FIG. 11 is executed in parallel with the flowchart of FIG. 12. When step S60 of FIG. 11 has been executed, step S309 of FIG. 12 selects "YES". When step S60 of FIG. 11 has not been executed, step S309 of FIG. 12 selects "NO".

The flowchart of the display process of the adjustment images 113 of FIG. 12 is started and ended by the flowchart of the adjustment method of the display positions of the virtual images of FIG. 11. When step S30 of FIG. 11 has been executed, step S300 of FIG. 12 is started. When step S60 of FIG. 11 has been executed, determination of "YES" is made in step S309 of FIG. 12. Then, the flowchart of FIG. 12 ends in step S310. Thus, the process from step S301 to S309 of FIG. 12 is executed in parallel with the process from step S30 to S60 of FIG. 11.

Thereby, the observer can alternately see the far virtual image and near virtual image and compare the two virtual images. The predetermined time used for the determination in steps 303 and 307 is desirably as short as possible. This allows the observer to compare the far virtual image and near virtual image in a short time.

SECOND MODIFICATION EXAMPLE

In the above embodiment, the driver 500 vertically sees the virtual image area 400. However, in a second modification example, the virtual image area 400 is inclined.

Figure 13:
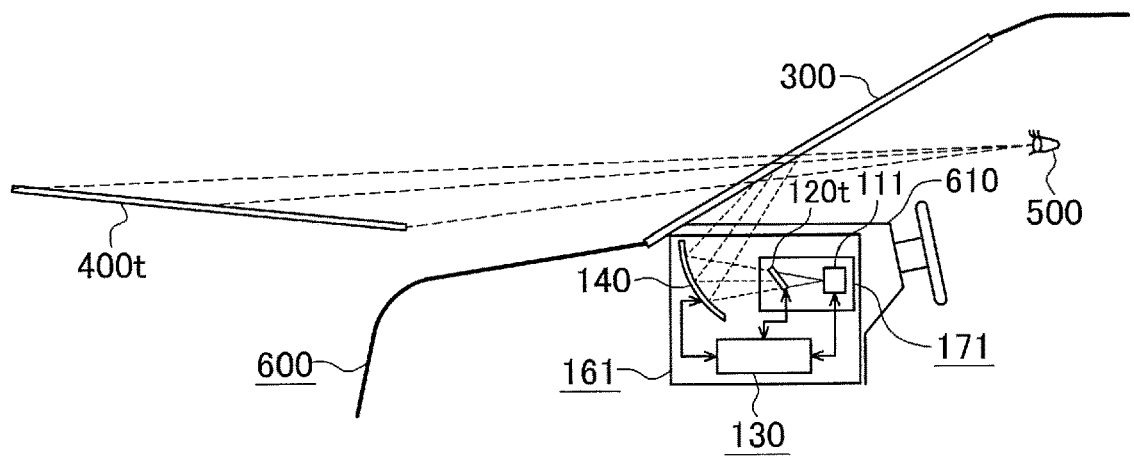
FIG. 13 is a schematic diagram illustrating a display device according to a second modification example of the first embodiment of the present invention.

FIG. 13 is a schematic diagram illustrating an example of a configuration of a virtual image display device 161 according to the second modification example.

An inclined screen 120t is inclined relative to an optical axis C of a light source unit 111. Thus, an inclined virtual image area 400t, which can be seen from the driver 500, is inclined so that its upper end is located farther than its lower end. The inclined virtual image area 400t is inclined so that a high position is farther than a low position as viewed from the driver 500. A virtual image projected to the inclined virtual image area 400t has depth in the distance to the virtual image. That is, a virtual image projected on the inclined virtual image area 400t includes portions displayed at different distances.

Thereby, it is possible to make the inclined virtual image area 400t closer to the slope of the road as viewed from the driver 500. Then, for example, it is possible to display an arrow for route guidance or the like as a virtual image with improved visibility.

Figure 14A:
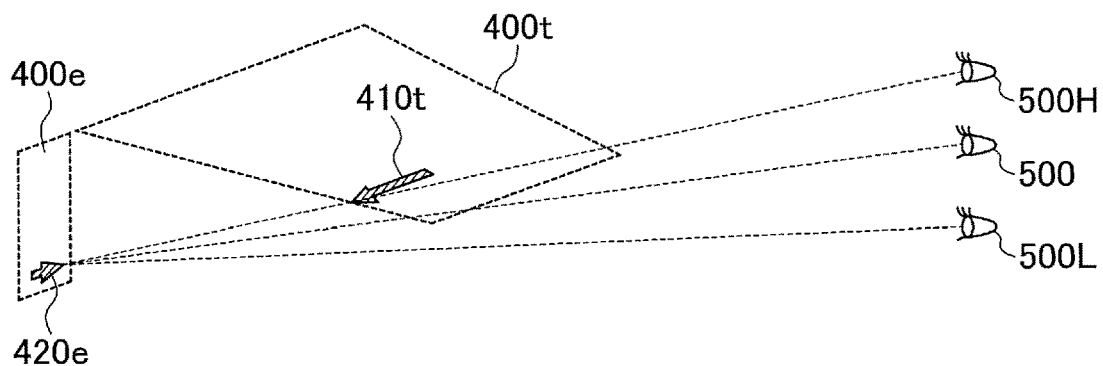
FIGS. 14A to 14C are explanatory diagrams of virtual images of the display device according to the second modification example of the first embodiment of the present invention.
Figure 14B:
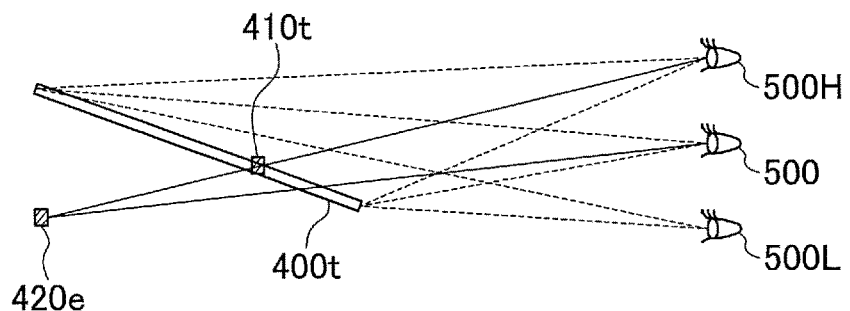
Figure 14C:
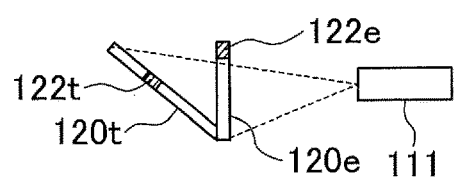

FIGS. 14A to 14C are explanatory diagrams for explaining a display state of virtual images.

FIG. 14A is a view of a state where the virtual images are displayed, as obliquely viewed from above. FIG. 14A is a view of a state where the driver 500 sees the virtual images, as obliquely viewed from above. FIG. 14B is a view of the state where the virtual images are displayed, as viewed from a side. FIG. 14B is a view of FIG. 14A as viewed from a side. FIG. 14C is a diagram illustrating an example of a configuration of the light source unit 111 and a screen 120 (screen 120t and screen 120e) of an image display unit (or image display) 171.

The inclined virtual image area 400t is an area in which a virtual image is displayed by the inclined screen 120t. A near virtual image is displayed on the lower side of the inclined virtual image area 400t. A far virtual image is displayed on the upper side of the inclined virtual image area 400t.

A far virtual image area 400e is located to the left of the inclined virtual image area 400t as viewed from the driver 500. The driver 500 vertically sees the far virtual image area 400e. The distance from the driver 500 to the far virtual image area 400e is equal to the distance from the driver 500 to the upper side of the inclined virtual image area 400t.

The image display unit 171 includes the inclined screen 120t and position adjustment screen 120e.

The position adjustment screen 120e is a screen for the far virtual image area 400e. A far adjustment virtual image 420e is a virtual image due to a far adjustment intermediate image 122e projected on the position adjustment screen 120e.

The inclined screen 120t is a screen for the inclined virtual image area 400t. An adjustment virtual image 410t for inclination is a virtual image due to an adjustment intermediate image 122t for inclination projected on the inclined screen 120t.

The far adjustment intermediate image 122e is displayed at a higher position than the adjustment intermediate image 122t for inclination. On the other hand, the far adjustment virtual image 420e is displayed at a lower position than the adjustment virtual image 410t for inclination.

As illustrated in FIG. 14B, when the eye height of the driver 500 changes, the angle at which the inclined virtual image area 400t is seen.

From a high position like a driver 500H, the virtual image looks vertically large. On the other hand, from a low position like a driver 500L, the virtual image looks vertically small.

FIGS. 14A and 14B show that the appearance of the virtual images changes with changes in the position of the driver 500. Conversely, it is also possible to relatively change the position of the driver 500 by changing the display positions of the virtual images. When the eye position of the driver 500 changes, it is possible to easily adjust the appearance of the inclined virtual image area 400t by adjusting the display positions of the virtual images.

For example, a state where the far adjustment virtual image 420e and the adjustment virtual image 410t for inclination are seen at the same position, like a state where the driver 500H looks, is taken as a reference state. In this example, the upper end of the inclined virtual image area 400t and the upper end of the far virtual image area 400e are located at the same height. The adjustment virtual image 410t for inclination serves as a near adjustment virtual image and is adjusted to a height equal to that of the far adjustment virtual image 420e.

In the inclined virtual image area 400t, the farthest virtual image position is the upper end of the inclined virtual image area 400t. In the inclined virtual image area 400t, the near adjustment virtual image is the adjustment virtual image 410t for inclination.

The distance in the vertical direction between a farthest adjustment virtual image and a nearest adjustment virtual image is equal to the distance from the upper end of the far virtual image area 400e to the far adjustment virtual image 420e. A near virtual image and a far virtual image are seen to be spaced from each other by an amount corresponding to the distance in the vertical direction. The driver 500 can see virtual images with a sense close to a real sense of perspective.

The driver 500 can simultaneously see the screen (position adjustment screen 120e) for adjusting the display positions of the virtual images and the screen (screen 120, 120t)

for displaying an image. This facilitates adjustment of the display positions of the virtual images.

The position adjustment screen 120e is placed so that a distance to a virtual image displayed by the position adjustment screen 120e is different from a distance to a virtual image displayed by the screen 120. Thus, the position adjustment screen 120e can be employed regardless of the configuration of the screen 120.

Tick marks may be displayed in at least one of the far adjustment virtual image 420e and the adjustment virtual image 410t for inclination. Tick marks may be drawn in at least one of the far adjustment image and the adjustment image for inclination. The far adjustment virtual image 420e and adjustment virtual image 410t for inclination are adjusted using the displayed tick marks. Thereby, it is possible to adjust the inclination angle of the inclined virtual image area 400t. It is possible to recognize an angle formed by the two virtual images by means of the tick marks.

The position adjustment screen 120e separately provided may have a simple display function using an LED or the like. In this case, the position adjustment screen 120e displays the far adjustment image by using the display function.

Instead of the far virtual image area 400e, a near virtual image area may be provided. A near adjustment virtual image is projected on the near virtual image area. In this case, a far adjustment virtual image is projected on the inclined virtual image area 400t, and the adjustment virtual image 410t for inclination is used as the far adjustment virtual image. The driver 500 adjusts the display positions of the virtual images by using the far adjustment virtual image and near adjustment virtual image.

<Example of Inclined Virtual Image>

The following describes an example of a case where the virtual image display device 161 displays, in AR, an arrow for route guidance on the road surface.

Figure 15:
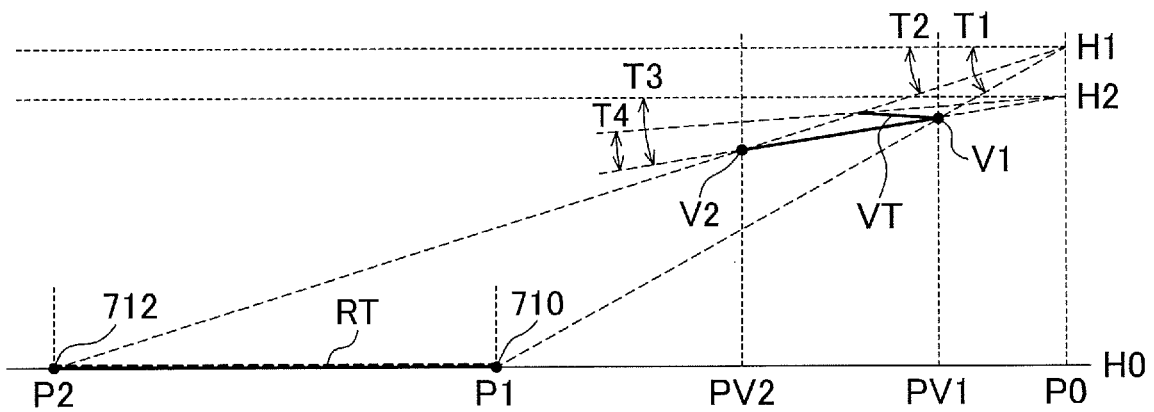
FIG. 15 is an explanatory diagram for explaining the relationship between virtual images of the display device according to the second modification example of the first embodiment of the present invention and objects subjected to AR display.

FIG. 15 is an explanatory diagram for explaining the relationship between virtual images displayed by the virtual image display device 161 and objects 710 and 712 subjected to AR display.

Here, elements that are the same as those of FIG. 7 are given the same reference characters, and description thereof will be omitted. The same elements are the heights H0, H1, and H2, depression angles T1, T2, and T3, point-like virtual images V1 and V2, objects 710 and 712, and positions P0, P1, P2, PV1, and PV2.

The visual angle T4 is a visual angle of the virtual image display device 161. The visual angle T4 is an angle of a virtual image range seen from height H2 at which the virtual image display device 161 is placed. The near virtual image V1 is located at the lower end of the visual angle T4 of the virtual image display device 161. The far virtual image V2 is located at the lower end of the visual angle T4 of the virtual image display device 161.

The objects 710 and 712 are objects subjected to AR display by the virtual image display device 161.

An AR image RT is displayed on the ground (road surface) from position P1 of the near object 710 to position P2 of the far object 712 when seen from height H1.

The virtual image display device 161 displays a virtual image VT. The virtual image VT is displayed in an inclined manner. Here, the end of the virtual image VT on the near side is at the position of the point-like near virtual image V1. The end of the virtual image VT on the far side is at a position where a straight line connecting the position of height H1 and position P2 of the far object 712 intersects the upper end of the visual angle T4.

In this manner, for example, a virtual image of an arrow for route guidance or the like is superimposed and displayed on the road surface. Thus, the driver 500 can easily recognize the provided information.

The position of the near virtual image V1 and the position of the far virtual image V2 are located at the lower end of the visual angle T4 of the virtual image display device 161. However, the positions of the virtual images V1 and V2 are not limited to these. For example, the positions of the virtual images V1 and V2 may be located at the center or upper end of the visual angle T4 of the virtual image display device 161. However, in this case, it is necessary to adjust positional association between the objects 710 and 712 subjected to AR display and an image (virtual image RT) displayed as a virtual image.

Although some configuration examples of the screen 120 have been described, it is not limited to these. For example, the moving screen 120 or inclined screen 120t may be divided. Various combinations of screens are possible.

Each embodiment described above may use terms, such as "parallel" or "perpendicular", indicating the positional relationships between parts or the shapes of parts. These terms are intended to include ranges taking account of manufacturing tolerances, assembly variations, or the like. Thus, recitations in the claims indicating the positional relationships between parts or the shapes of parts are intended to include ranges taking account of manufacturing tolerances, assembly variations, or the like.

Further, although the embodiments of the present invention have been described as above, the present invention is not limited to these embodiments.

Based on the above embodiments, contents of the invention will be described below as Appendixes (1) and (2). In Appendixes (1) and (2), numbering is made independently. Thus, for example, Appendixes (1) and (2) each include "Appendix 1."

It is possible to combine features in Appendix (1) and features in Appendix (2).

Appendix (1)

Appendix 1

A display device for displaying a virtual image, comprising:
an image display unit to emit image light that is displayed as a virtual image;
a controller to change a distance to a position at which the virtual image is projected; and
a virtual image adjuster to adjust a direction in which the virtual image is projected,
wherein the display device changes the direction in which the virtual image is projected, depending on the distance to the virtual image.

Appendix 2

The display device for displaying a virtual image of Appendix 1, wherein the image display unit further emits, as image light, a plurality of adjustment images at different distances that are projected as adjustment virtual images.

Appendix 3

The display device for displaying a virtual image of Appendix 2, wherein when the adjustment virtual images are projected, the display device makes an adjustment so that a far adjustment virtual image is displayed at a higher position than a near adjustment virtual image.

Appendix 4

The display device for displaying a virtual image of Appendix 2 or 3, wherein the display device simultaneously or alternately projects the adjustment virtual images.

Appendix 5

The display device for displaying a virtual image of any one of Appendixes 2 to 4, wherein the adjustment images allow recognition that an angle formed by projection directions of the adjustment virtual images as viewed from an observer is a predetermined angle.

Appendix 6

The display device for displaying a virtual image of any one of Appendixes 1 to 5, wherein the controller provides depth to the distance to the virtual image.

Appendix 7

An adjustment method for displaying a virtual image, comprising:
a step of emitting image light that is displayed as at least one virtual image;
a step of changing a distance to a position at which the at least one virtual image is projected; and
a step of adjusting a direction in which the at least one virtual image is projected, by using the at least one virtual image,
wherein the adjustment method changes the direction in which the at least one virtual image is projected, depending on the distance to the at least one virtual image.

Appendix 8

The adjustment method for displaying a virtual image of Appendix 7, wherein
the at least one virtual image comprises a first virtual image and a second virtual image, and
the adjustment method adjusts the direction in which the at least one virtual image is projected, by using the first virtual image and the second virtual image.

Appendix 9

The adjustment method for displaying a virtual image of Appendix 8, wherein the second virtual image is displayed at a farther position than the first virtual image, and the second virtual image is adjusted to be displayed at a higher position than the first virtual image.

Appendix 10

The adjustment method for displaying a virtual image of Appendix 8 or 9, wherein the adjustment method simultaneously or alternately projects the first virtual image and the second virtual image.

Appendix 11

The adjustment method for displaying a virtual image of any one of Appendixes 8 to 10, wherein the adjustment method emits, as image light, an adjustment image that allows an observer to recognize that an angle formed by projection directions of the first virtual image and the second virtual image is a predetermined angle.

Appendix 12

The adjustment method for displaying a virtual image of any one of Appendixes 7 to 11, wherein the at least one virtual image is displayed while provided with depth.

Appendix (2)

Appendix 1

A display device used in a vehicle for displaying virtual images, the display device comprising:
an image display unit including a light source unit to emit image light and a screen on which the image light is projected; and
a controller to adjust positions at which the virtual images are displayed, wherein
images displayed on the screen are projected as the virtual images,
the virtual images include a first virtual image and a second virtual image displayed at a position different from that of the first virtual image,
the image display unit displays, on the screen, a first adjustment image that is projected to a display area of the first virtual image and a second adjustment image that is projected to a display area of the second virtual image, and
the controller adjusts a position of the display area of the first virtual image and a position of the display area of the second virtual image on a basis of the first adjustment image and the second adjustment image.

Appendix 2

The display device of Appendix 1, wherein the controller adjusts positions in a height direction at which the virtual images are displayed.

Appendix 3

The display device of Appendix 2, wherein the second virtual image is displayed farther from the vehicle than the first virtual image.

Appendix 4

The display device of Appendix 3, wherein when a position in the height direction of the display area of the first virtual image coincides with a position in the height direction of the display area of the second virtual image, a first adjustment virtual image that is a virtual image of the first adjustment image is displayed in an upper direction of the vehicle from a second adjustment virtual image that is a virtual image of the second adjustment image.

Appendix 5

The display device of Appendix 4, wherein the controller makes positions in the height direction at which the virtual image of the first adjustment image and the virtual image of the second adjustment image are displayed coincide with each other.

Appendix 6

The display device of Appendix 1, wherein the controller adjusts an inclination angle of at least one of the virtual images.

Appendix 7

The display device of Appendix 6, wherein
a tick mark is drawn in at least one of the first adjustment image and the second adjustment image, and
the controller adjusts an inclination angle of the display area of the first virtual image or the display area of the second virtual image on a basis of a displayed tick mark.

Appendix 8

The display device of any one of Appendixes 1 to 7, wherein the first adjustment image and the second adjustment image are simultaneously or alternately displayed as virtual images.

Appendix 9

The display device of any one of Appendixes 1 to 8, further comprising a projection optical system to project, as the virtual images, images displayed on the screen,
wherein the controller adjusts the projection optical system, thereby adjusting the positions at which the virtual images are displayed.

Appendix 10

An adjustment method used in a vehicle for displaying virtual images, the virtual images being displayed in a display area of a first virtual image and a display area of a second virtual image at a position different from that of the display area of the first virtual image, the adjustment method comprising:
a first step of displaying a first virtual image in the display area of the first virtual image by using a first adjustment image, and displaying a second virtual image in the display area of the second virtual image by using a second adjustment image; and
a second step of adjusting a position of the display area of the first virtual image and a position of the display area of the second virtual image.

Appendix 11

The adjustment method of Appendix 10, wherein the second step adjusts positions in a height direction at which the virtual images are displayed.

Appendix 12

The adjustment method of Appendix 11, wherein the second virtual image is displayed farther from the vehicle than the first virtual image.

Appendix 13

The adjustment method of Appendix 12, wherein when a position in the height direction of the display area of the first virtual image coincides with a position in the height direction of the display area of the second virtual image, a first adjustment virtual image that is a virtual image of the first adjustment image is displayed in an upper direction of the vehicle from a second adjustment virtual image that is a virtual image of the second adjustment image.

Appendix 14

The adjustment method of Appendix 13, wherein the adjustment method makes positions in the height direction at which the virtual image of the first adjustment image and the virtual image of the second adjustment image are displayed coincide with each other.

Appendix 15

The adjustment method of Appendix 10, wherein the second step adjusts an inclination angle of at least one of the virtual images.

Appendix 16

The adjustment method of Appendix 15, wherein a tick mark is drawn in at least one of the first adjustment image and the second adjustment image, and the adjustment method adjusts an inclination angle of the display area of the first virtual image or the display area of the second virtual image on a basis of a displayed tick mark.

Appendix 17

The adjustment method of any one of Appendixes 10 to 16, wherein the first adjustment image and the second adjustment image are simultaneously or alternately displayed as virtual images.

REFERENCE SIGNS LIST 100 virtual image display device, 110 image display unit, 111 light source unit, 112 input image format, 113, 113a, 113b adjustment image, 120, 120a, 120b, 120e, 120t screen, 121, 121a, 121b projection area, 122, 122a, 122b, 122c, 122d, 122e, 122t adjustment intermediate image, 130 controller, 131 image data converter, 132 light source controller, 133 virtual image controller, 134 projection position controller, 140 magnifying mirror, 141 magnifying mirror drive circuit, 142 screen driver circuit, 150 input unit, 161 virtual image display device, 171 image display unit, 300 windshield, 400, 400a, 400b, 400e, 400t virtual image area, 410, 410a, 410t, 411, 411a short-distance adjustment virtual image, 420, 420a, 420b, 420e, 421, 421a long-distance adjustment virtual image, 500, 500L, 500H driver, 600 vehicle, 610 dashboard, 700, 710, 712 object, C optical axis, H0, H1, H2 height, HL horizontal line, LA, LB position, P0, P1, P2, PV1, PV2 position, RN, RF, RT AR image, S1, S2 image signal data, S3, S4, S5 control signal, S6 signal, T1, T2, T3 depression angle, T4 visual angle, TA, TB depression angle, V1, V2 point-like virtual image, VN, VF virtual image.

The invention claimed is:
1. A display device used in a vehicle for displaying virtual images, the display device comprising:
a display including a light source to emit image light and a screen on which the image light is projected;
a projection optical system to receive the image light from the screen and project the image light toward one of a windshield and a combiner of the vehicle to project, as the virtual images, images displayed on the screen; and a controller to adjust the projection optical system, thereby adjusting positions at which the virtual images are displayed, wherein the virtual images include a first virtual image and a second virtual image displayed at a position different from that of the first virtual image, the first virtual image is displayed in a first virtual image area and the second virtual image is displayed in a second virtual image area, the display displays, on the screen, a first adjustment image that is projected to the first virtual image area and a second adjustment image that is projected to the second virtual image area, and the controller adjusts a position of the first virtual image area and a position of the second virtual image area by adjusting the projection optical system on a basis of the first adjustment image and the second adjustment image.

2. The display device of claim 1, wherein the controller adjusts positions in a height direction at which the virtual images are displayed.

3. The display device of claim 2, wherein the second virtual image is displayed farther from the vehicle than the first virtual image.

4. The display device of claim 3, wherein when a position in the height direction of the first virtual image area coincides with a position in the height direction of the second virtual image area, a first adjustment virtual image that is a virtual image of the first adjustment image is displayed in an upper direction of the vehicle from a second adjustment virtual image that is a virtual image of the second adjustment image.

5. The display device of claim 4, wherein the controller makes positions in the height direction at which the virtual image of the first adjustment image and the virtual image of the second adjustment image are displayed coincide with each other.

6. The display device of claim 1, wherein the controller adjusts an inclination angle of at least one of the virtual images.

7. The display device of claim 6, wherein a tick mark is drawn in at least one of the first adjustment image and the second adjustment image, and the controller adjusts an inclination angle of the first virtual image area or the second virtual image area on a basis of a displayed tick mark.

8. The display device of claim 1, wherein the first adjustment image and the second adjustment image are simultaneously or alternately displayed as virtual images.

9. The display device of claim 1, wherein the second virtual image is displayed farther from the vehicle than the first virtual image, the screen is movable between a first position at which an image on the screen is displayed as the first virtual image in the first virtual image area and a second position at which an image on the screen is displayed as the second virtual image in the second virtual image area, and the controller moves the screen to the first position and causes the display to display the first adjustment image on the screen at the first position, and moves the screen to the second position and causes the display to display the second adjustment image on the screen at the second position.

10. An adjustment method for a display device used in a vehicle for displaying virtual images, the display device including a light source to emit image light, a screen on which the image light is projected, and a projection optical system to receive the image light from the screen and project the image light toward one of a windshield and a combiner of the vehicle to project, as the virtual images, images displayed on the screen, the virtual images including a first virtual image and a second virtual image displayed at a position different from that of the first virtual image, the first virtual image being displayed in a first virtual image area and the second virtual image being displayed in a second virtual image area, the adjustment method comprising:

displaying, on the screen, a first adjustment image that is projected to the first virtual image area and a second adjustment image that is projected to the second virtual image area; and adjusting a position of the first virtual image area and a position of the second virtual image area by adjusting the projection optical system on a basis of the first adjustment image and the second adjustment image.

11. The adjustment method of claim 10, wherein the second virtual image is displayed farther from the vehicle than the first virtual image, the screen is movable between a first position at which an image on the screen is displayed as the first virtual image in the first virtual image area and a second position at which an image on the screen is displayed as the second virtual image in the second virtual image area, and the displaying comprises moving the screen to the first position and displaying the first adjustment image on the screen at the first position, and moving the screen to the second position and displaying the second adjustment image on the screen at the second position.

12. A display device used in a vehicle for displaying virtual images, the display device comprising:

a display including a light source to emit image light and a screen on which the image light is projected;

a projection optical system to receive the image light from the screen and project the image light toward one of a windshield and a combiner of the vehicle to project, as the virtual images, images displayed on the screen; and a controller to adjust the projection optical system, thereby adjusting positions at which the virtual images are displayed, wherein the virtual images include a first virtual image and a second virtual image displayed at a position different from that of the first virtual image, the first virtual image is displayed in a first virtual image area and the second virtual image is displayed in a second virtual image area, the first virtual image area is inclined so that an upper end of the first virtual image area is located farther than a lower end of the first virtual image area, the display displays, on the screen, a first adjustment image that is projected to the first virtual image area as a first adjustment virtual image and a second adjustment image that is projected to the second virtual image area as a second adjustment virtual image, the second adjustment virtual image being farther from or nearer to the vehicle than the first adjustment virtual image, and the controller adjusts an inclination angle of the first virtual image by adjusting the projection optical system on a basis of the first adjustment image and the second adjustment image.

* * * * *